United States Patent
Lee et al.

(10) Patent No.: US 10,847,799 B2
(45) Date of Patent: Nov. 24, 2020

(54) NEGATIVE ELECTRODE FOR LITHIUM METAL BATTERY AND LITHIUM METAL BATTERY COMPRISING THE SAME

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Yonggun Lee, Suwon-si (KR); Saebom Ryu, Suwon-si (KR); Toshinori Sugimoto, Hwaseong-si (KR); Yooseong Yang, Yongin-si (KR); Wonseok Chang, Seoul (KR); Joonseon Jeong, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 281 days.

(21) Appl. No.: 15/581,072

(22) Filed: Apr. 28, 2017

(65) Prior Publication Data
US 2017/0317352 A1  Nov. 2, 2017

(30) Foreign Application Priority Data

Apr. 29, 2016 (KR) .................. 10-2016-0053531
Apr. 18, 2017 (KR) .................. 10-2017-0049894

(51) Int. Cl.
*H01M 4/62* (2006.01)
*H01M 4/36* (2006.01)
(Continued)

(52) U.S. Cl.
CPC ............ *H01M 4/62* (2013.01); *H01M 4/134* (2013.01); *H01M 4/1395* (2013.01);
(Continued)

(58) Field of Classification Search
CPC ...... H01M 4/628; H01M 4/622; H01M 4/134; H01M 4/1395; H01M 4/382; H01M 4/405;
(Continued)

(56) References Cited

U.S. PATENT DOCUMENTS

| 4,357,215 A | 11/1982 | Goodenough et al. |
| 7,105,251 B2 | 9/2006 | Miyaki et al. |

(Continued)

FOREIGN PATENT DOCUMENTS

| JP | 2013541168 A | 11/2013 |
| KR | 1020050041093 A | 5/2005 |

(Continued)

OTHER PUBLICATIONS

European Search Report for European Patent Application No. 17168678.5 dated Jul. 5, 2017.
(Continued)

*Primary Examiner* — Laura Weiner
(74) *Attorney, Agent, or Firm* — Cantor Colburn LLP

(57) ABSTRACT

A negative electrode for a lithium metal battery including: a lithium metal electrode including a lithium metal or a lithium metal alloy; and a protective layer on at least portion of the lithium metal electrode, wherein the protective layer has a Young's modulus of about $10^6$ pascals or greater and includes at least one particle having a particle size of greater than 1 micrometer to about 100 micrometers, and wherein the at least one particle include an organic particle, an inorganic particle, an organic-inorganic particle, or a combination thereof.

17 Claims, 20 Drawing Sheets

(51) Int. Cl.
*H01M 10/052* (2010.01)
*H01M 10/42* (2006.01)
*H01M 4/134* (2010.01)
*H01M 4/1395* (2010.01)
*H01M 4/38* (2006.01)
*H01M 4/40* (2006.01)
*H01M 10/0525* (2010.01)
*H01M 10/0565* (2010.01)
*H01M 10/0568* (2010.01)
*H01M 10/0569* (2010.01)
*H01M 4/02* (2006.01)
*H01M 10/0585* (2010.01)

(52) U.S. Cl.
CPC ......... *H01M 4/366* (2013.01); *H01M 4/382* (2013.01); *H01M 4/405* (2013.01); *H01M 4/622* (2013.01); *H01M 4/628* (2013.01); *H01M 10/052* (2013.01); *H01M 10/0525* (2013.01); *H01M 10/0565* (2013.01); *H01M 10/0568* (2013.01); *H01M 10/0569* (2013.01); *H01M 10/4235* (2013.01); *H01M 10/0585* (2013.01); *H01M 2004/021* (2013.01); *H01M 2004/027* (2013.01); *H01M 2220/20* (2013.01); *Y02E 60/122* (2013.01); *Y02T 10/7011* (2013.01)

(58) Field of Classification Search
CPC ............ H01M 4/366; H01M 10/0525; H01M 10/0565; H01M 10/0568; H01M 10/0569; H01M 10/4235; H01M 10/0585; H01M 2004/027; H01M 2004/021; H01M 2220/20; Y02E 60/122; Y02T 10/7011
See application file for complete search history.

(56) References Cited

U.S. PATENT DOCUMENTS

| | | | |
|---|---|---|---|
| 7,513,136 B2 | 4/2009 | Laliberte et al. | |
| 7,531,012 B2 | 5/2009 | Sudano et al. | |
| 7,547,492 B2 | 6/2009 | Awano et al. | |
| 7,629,083 B2 * | 12/2009 | Cho | H01M 4/0402 427/123 |
| 7,968,224 B2 | 6/2011 | Sudano et al. | |
| 9,564,638 B2 | 2/2017 | Uemura | |
| 2002/0187398 A1 | 12/2002 | Mikhaylik et al. | |
| 2005/0095504 A1 * | 5/2005 | Kim | H01M 4/1395 429/246 |
| 2009/0263725 A1 | 10/2009 | Balsara et al. | |
| 2010/0221611 A1 | 9/2010 | Menke et al. | |
| 2010/0248026 A1 | 9/2010 | Hinoki et al. | |
| 2011/0033755 A1 | 2/2011 | Eitouni et al. | |
| 2011/0206994 A1 | 8/2011 | Balsara et al. | |
| 2011/0281173 A1 | 11/2011 | Singh et al. | |
| 2013/0273422 A1 | 10/2013 | Wegner et al. | |
| 2013/0337337 A1 | 12/2013 | Lee et al. | |
| 2014/0023915 A1 | 1/2014 | Matsuda et al. | |
| 2015/0155592 A1 | 6/2015 | Pratt | |
| 2015/0249243 A1 | 9/2015 | Nagino et al. | |
| 2016/0013462 A1 | 1/2016 | Cui et al. | |
| 2016/0013515 A1 | 1/2016 | Lee et al. | |
| 2016/0064770 A1 | 3/2016 | Lee et al. | |
| 2016/0064772 A1 | 3/2016 | Choi et al. | |
| 2016/0064773 A1 | 3/2016 | Choi et al. | |
| 2016/0072148 A1 | 3/2016 | Lee et al. | |
| 2016/0079625 A1 | 3/2016 | Shon et al. | |
| 2016/0087306 A1 | 3/2016 | Lee et al. | |
| 2016/0093879 A1 | 3/2016 | Song et al. | |
| 2016/0093916 A1 | 3/2016 | Moon et al. | |
| 2016/0111695 A1 | 4/2016 | Kanamura et al. | |
| 2016/0240831 A1 | 8/2016 | Zeng et al. | |
| 2016/0294005 A1 | 10/2016 | Lee et al. | |
| 2016/0329567 A1 * | 11/2016 | Lee | H01M 4/628 |
| 2016/0336618 A1 | 11/2016 | Lee et al. | |
| 2016/0351956 A1 | 12/2016 | Lee et al. | |
| 2016/0372743 A1 * | 12/2016 | Cho | H01M 4/382 |
| 2017/0062829 A1 | 3/2017 | Ryu et al. | |
| 2017/0301920 A1 * | 10/2017 | Liu | H01M 4/628 |
| 2017/0324097 A1 | 11/2017 | Lee et al. | |

FOREIGN PATENT DOCUMENTS

| | | |
|---|---|---|
| KR | 1020130126673 A | 11/2013 |
| WO | 9701870 A1 | 1/1997 |
| WO | 0139293 A2 | 5/2001 |
| WO | 2013033126 A1 | 3/2013 |

OTHER PUBLICATIONS

Liang et al., "Polymer Nanofiber-Guided Uniform Lithium Deposition for Battery Electrodes", Nano Letters, 15, 2015, pp. 2910-2916.

Yan et al., "Ultrathin Two-Dimensional Atomic Crystals as Stable Interfacial Layer for Improvement of Lithium Metal Anode", Nano Letters, 14, 2014. pp. 6016-6022.

Zheng et al., "Interconnected hollow carbon nanospheres for stable lithium metal anodes", Nature Nanotechnology, 2014, pp. 1-6.

Cheng et al., "Dendrite-Free Lithium Deposition Induced by Uniformly Disributed Lithium Ions for Efficient Lithium Metal Batteries", Advanced Materials, 28, 2016, 2888-2895.

Zhang et al., "Facile assembly of a polystyrene microsphere/graphene oxide/porphyrin composite with core-shell sturcture" RSC Advances, 4, 2014, 37854-37858.

* cited by examiner

NEGATIVE ELECTRODE FOR LITHIUM METAL BATTERY AND LITHIUM METAL BATTERY COMPRISING THE SAME

CROSS-REFERENCE TO RELATED APPLICATION

This application claims the benefit of Korean Patent Application No. 10-2016-0053531, filed on Apr. 29, 2016, and Korean Patent Application No. 10-2017-0049894, filed on Apr. 18, 2017, in the Korean Intellectual Property Office, and all the benefits accruing therefrom under 35 U.S.C. § 119, the contents of which in their entirety are incorporated herein by reference.

BACKGROUND

1. Field

The present disclosure relates to a negative electrode for a lithium metal battery and a lithium metal battery including the negative electrode.

2. Description of the Related Art

Lithium secondary batteries are high-performance batteries having a relatively high energy density as compared to other types of secondary batteries, and are applicable to various fields including, for example, electric vehicles.

A lithium secondary battery may use a lithium metal thin film as a negative electrode. When a lithium metal thin film is used as the negative electrode, the negative electrode may react with the liquid electrolyte during charging or discharging of the battery due to the high reactivity between the lithium metal and the electrolyte, and dendritic growth may occur on the lithium metal thin film negative electrode. Accordingly, a lithium secondary battery including a lithium metal thin film may have reduced lifetime and stability. Therefore, there is a need for a lithium secondary battery having improved properties.

SUMMARY

Provided is a negative electrode for a lithium metal battery, the negative electrodes including a protective layer with desirable mechanical properties.

Provided is a lithium metal battery with improved cell performance and including the of the negative electrodes.

According to an aspect of an embodiment, a negative electrode for a lithium metal battery includes: a lithium metal electrode including lithium metal or a lithium metal alloy; and a protective layer on at least a portion of the lithium metal electrode, wherein the protective layer has a Young's modulus of about $10^6$ pascals (Pa) or greater and includes at least one particle having a particle size of greater than 1 micrometer to about 100 micrometers, and wherein the at least one particle includes an organic particle, an inorganic particle, an organic-inorganic particle, or a combination thereof.

According to an aspect of another embodiment, a lithium metal battery includes a positive electrode, a negative electrode, and an electrolyte between the positive electrode and the negative electrode, wherein the negative electrode includes: a lithium metal electrode comprising lithium metal or a lithium metal alloy; and a protective layer on at least a portion of the lithium metal electrode, wherein the protective layer has a Young's modulus of about $10^6$ Pascals or greater and comprises at least one particle having a particle size of greater than 1 micrometer to about 100 micrometers or less, and wherein the at least one particle comprises an organic particle, an inorganic particle, an organic-inorganic particle, or a combination thereof.

Also disclosed is method of manufacturing a negative electrode for a lithium metal battery, the method including: providing a lithium metal electrode including lithium metal or a lithium metal alloy; and disposing a protective layer on at least a portion of the lithium metal electrode to manufacture the negative electrode, wherein the protective layer has a Young's modulus of about $10^6$ pascals or greater and comprises at least one particle having a particle size of greater than 1 micrometer to about 100 micrometers, and wherein the at least one particle comprises an organic particle, an inorganic particle, an organic-inorganic particle, or a combination thereof.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
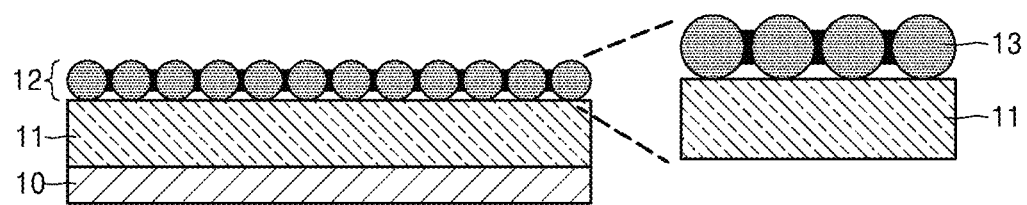
FIGS. 1A to 1D are schematic views illustrating various structures of an embodiment of a negative electrode for a lithium metal battery.

Reference will now be made in detail to exemplary embodiments of a negative electrode for a lithium metal battery and a lithium metal battery including a negative electrode according to any of the embodiments, examples of which are illustrated in the accompanying drawings, wherein like reference numerals refer to like elements throughout. In this regard, the present embodiments may have different forms and should not be construed as being limited to the description set forth herein. Rather, these embodiments are provided so that this disclosure will be thorough and complete, and will fully convey the scope of the invention to those skilled in the art. Accordingly, the embodiments are described below, by referring to the figures, to explain various aspects.

When an element or layer is referred to as being "on" or "above" another element or layer, it includes the element or layer that is directly or indirectly in contact with the another element or layer. Thus it will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, "average particle size" or "average particle diameter" or "D50 particle size" refers to a particle diameter corresponding to 50% of the particles in a distribution curve in which particles are accumulated in the order of particle diameter from the smallest particle to the largest particle and a total number of accumulated particles is 100%. The average particle size may be measured by methods known to those of skill in the art. For example, the average particle size may be measured with a particle size analyzer or may be measured by using a transmission electron microscope (TEM) or a scanning electron microscope (SEM) image. As an example of other measuring methods, average particle size may be measured with a measurement device using dynamic light scattering, the number of particles within predetermined size ranges may be counted, and an average particle diameter may be calculated therefrom.

As used herein the term "porosity" is used to refer to a measure of the empty space (i.e., voids or pores) in a material and is determined as a percentage of the volume of voids in a material based on the total volume of the material.

According to an embodiment of the present disclosure, there is provided a negative electrode for a lithium metal battery, the negative electrode including: a lithium metal electrode including lithium metal or a lithium metal alloy; and a protective layer disposed on at least a portion of the lithium metal electrode, wherein the protective layer has a Young's modulus of about $10^6$ Pa or greater and includes at least one particle having a particle size of greater than about 1 micrometer (μm) to about 100 μm.

The lithium metal or a lithium metal alloy has a relatively high electric capacity per unit weight, and thus may be used to implement a high-capacity battery. However, using such a lithium metal or lithium metal alloy may cause dendritic growth during the deposition/dissolution of lithium ions during charging and discharging of the battery and consequently results in a short circuit between the positive and negative electrodes. An electrode including a lithium metal or lithium metal alloy may be highly reactive with the electrolyte, and thus may result in a side reaction between lithium metal or lithium metal alloy and the electrolyte. Due to these side reactions, the cycle lifetime of a battery is reduced. To address this problem, a protective layer which protects the surface of the electrode including the lithium metal or lithium metal alloy has been developed.

Accordingly, the present inventors have advantageously developed a protective layer, which includes a lithium salt or a liquid electrolyte. When the protective layer includes a liquid electrolyte, the liquid electrolyte may form ion conducting paths so that the negative electrode may have improved conductivity. Thus, a lithium metal battery with stable cycle characteristics may be manufactured using a negative electrode including the protective layer.

The liquid electrolyte may include an organic solvent, an ionic liquid, and a lithium salt. The liquid electrolyte may occupy about 30 volume percent (%) to about 60 volume % of the total volume of the protective layer. For example, the liquid electrolyte may occupy about 35 volume % to about 55 volume %, or about 40 volume % to about 50 volume % of the total volume of the protective layer.

In case the finally obtained protective layer includes a liquid electrolyte, the liquid electrolyte may be added to the preparation of the protective layer. Otherwise, the protective layer does not include the liquid electrolyte during the preparation of the protective layer. However, after the lithium metal battery using the proactive layer without the liquid electrolyte is operated, the finally obtained protective layer may be contain in which the liquid electrolyte contained in the lithium metal battery is transferred.

In some embodiments, the at least one particle in the protective layer may have a particle size of 1.1 μm to about 75 μm, for example, about 1.3 μm to about 50 μm, or about 1.3 μm to about 25 μm, or about 1.5 μm to about 20 μm, or about 1.5 μm to about 10 μm.

In some embodiments, the at least one particle includes poly(styrene-divinylbenzene) copolymer microspheres having an average particle diameter of about 3 μm and poly(styrene-divinylbenzene) copolymer microspheres having an average particle diameter of about 8 μm in a weight ratio of 1:1. Alternatively, the at least one particle includes poly(styrene-divinylbenzene) copolymer microspheres having an average particle diameter of about 3 μm and poly(styrene-divinylbenzene) copolymer microspheres having an average particle diameter of about 1.3 μm in a weight ratio of 1:1. The particle includes poly(styrene-co-divinylbenzene) copolymer microspheres having an average particle diameter of about 3 μm and poly(styrene-co-divinylbenzene) copolymer microspheres having an average particle diameter of about 1.1 μm at a weight ratio of 1:1.

According to an embodiment, the particle is a microsphere having a mono-modal particle diameter distribution. The mono-modal particle diameter distribution may be defined by a standard deviation of less than 40%, for example, 20% or less, or 10% or less, and having a range of about 1% or greater to less than about 40%, or in a range of about 2% to about 25%, or in a range of about 3% to about 10%, when analyzed by a particle diameter analyzer (Dynamic Light Scattering: DLS, Nicomp 380).

The protective layer may have a Young's modulus of about $10^6$ Pa or greater, for example, about $10^7$ Pa or greater, or about $10^8$ Pa or greater. The Young's modulus may be from about $10^6$ Pa to about $10^{11}$ Pa, or from about $10^7$ Pa to about $10^{10}$ Pa, or from about $10^7$ Pa to about $10^9$ Pa. When the protective layer has a Young's modulus within these ranges, the protective layer may have good tensile strength and good mechanical properties.

The Young's modulus is used as a measure of the stiffness of the protective layer and has the same meaning as a "tensile modulus." The tensile modulus of the protective layer may be measured according to ASTM D412 using dynamic mechanical analysis system (DMA800; available from TA Instruments) as follows. Protective layer samples are prepared according to the ASTM standard D412 (Type V specimens), and variations in strain with respect to stress in a protective layer sample are measured at a temperature of about 25° C., a relative humidity of about 30%, and a rate of 5 millimeters (mm) per minute, thereby to obtain a stress-strain curve. The tensile modulus of the protective layer is calculated from the slope of the stress-strain curve.

The at least one particle in the protective layer may have a cross-linked structure. The at least one particle in the protective layer may have a chemically cross-linked structure or a physically cross-linked structure.

The protective layer may include the at least one particle having a chemically or physically cross-linked structure. The at least one particle may include, for example, an organic particle of a cross-linked polymer obtained from a polymer having a cross-linkable functional group, an inorganic particle having a cross-linked structure due to a cross-linkable functional group on a surface thereof, or the like. The cross-linkable functional group, which is involved in a cross-linking reaction, may be, for example, an acryl group, a methacryl group, a vinyl group, or the like.

Cross-linking may be induced by heating or by irradiation with ultraviolet (UV) light. The heating or UV light irradiation may be performed so as not to adversely affect the lithium metal electrode.

A particle having a chemically cross-linked structure refers to a particle in which cross-linking has occurred using chemical methods (e.g., chemical agents) to facilitate bonding of cross-linkable functional groups present in a material for forming the particle. A particle having a physically cross-linked structure refers to a particle in which cross-linking has occurred using physical methods, for example, heating a polymer forming the particle until it reaches its glass transition (Tg) temperature, in order to facilitate bonding of crosslinkable functional groups, i.e., cross-links which are not formed using chemical agents. The cross-linking may occur within the particle itself and may also occur between adjacent particles in the protective layer.

The lithium metal or lithium metal alloy in the lithium metal electrode may have a thickness of about 100 μm or less, and in some embodiments, about 80 μm or less, or about 50 μm or less, or about 30 μm or less, or about 20 μm or less, and in some other embodiments, about 0.1 μm to about 60 μm. For example, the lithium metal or lithium metal alloy may have a thickness of about 1 μm to about 25 μm, and in some embodiments, about 5 μm to about 20 μm, and in some other embodiments, about 10 μm to about 20 μm.

The shape of the at least one particle in the protective layer may include a spherical shape, a rod shape, an ellipsoidal shape, a radial shape, or the like. A combination comprising at least one of the foregoing may also be used.

When the at least one particle in the protective layer has a spherical shape, the at least one particle in the protective layer may be a microsphere having an average particle diameter of greater than 1 μm to about 100 μm. The microspheres may have an average particle diameter of 1.1 μm to about 75 μm, for example, about 1.3 μm to about 50 μm, or about 1.3 μm to about 25 μm, or about 1.5 μm to about 20 μm, or about 1.5 μm to about 10 μm.

If the at least one particle in the protective layer has a particle size greater than about 100 μm, the protective layer and a lithium metal battery including the protective layer may both become too thick, and thus, the lithium metal battery may have lower energy density characteristics. Furthermore, if the protective layer is too thick, the protective layer may also have an increased porosity, and as a result the liquid electrolyte may be more likely to contact the lithium metal electrode.

If the at least one particle in the protective layer has a particle size of about 1 μm or less, a lithium metal battery including the protective layer with such small particles may have poor lithium deposition density characteristics as compared to a lithium metal battery with a protective layer including at least one particle having a particle size greater than about 1 μm and about 100 μm or less.

As used herein, the term "size" or "particle size" may refer to an average particle diameter when the particle has a spherical shape, and refers to the length of a major axis when the particle has a rod shape or an elliptical shape.

Figure 1B:
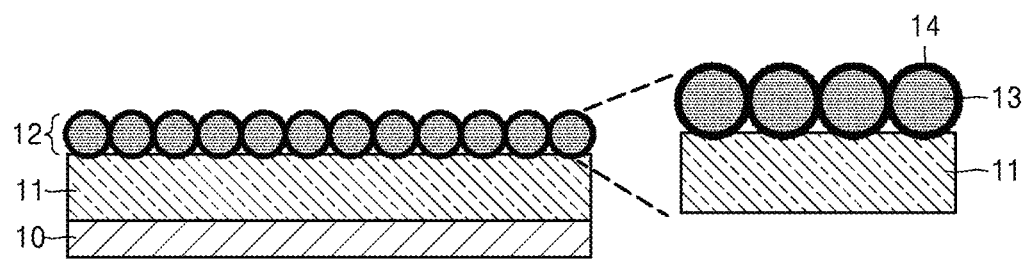
Figure 1C:
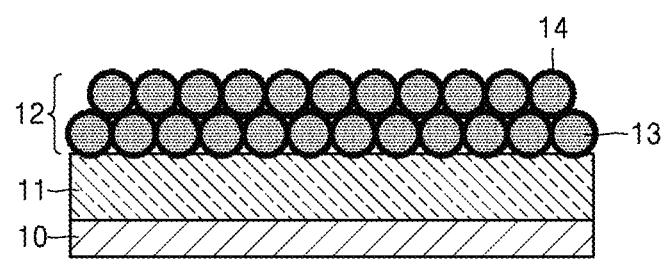
Figure 1D:
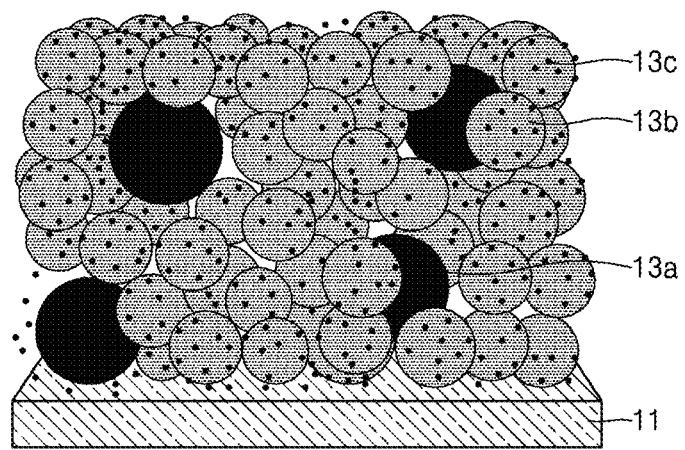
Figure 1E:
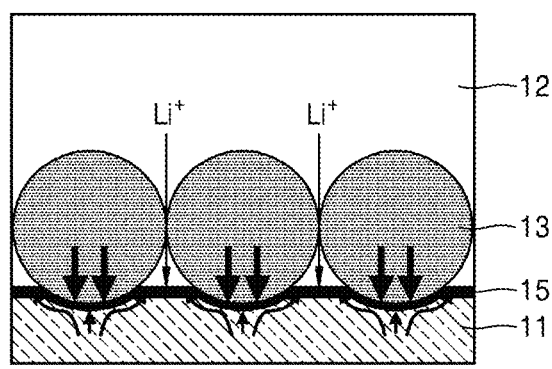
FIGS. 1E and 1F are schematic views explaining the theoretical principle behind using a protective layer on a negative electrode for suppressing and guiding dendritic growth in a lithium metal battery, according to an embodiment.
Figure 1F:
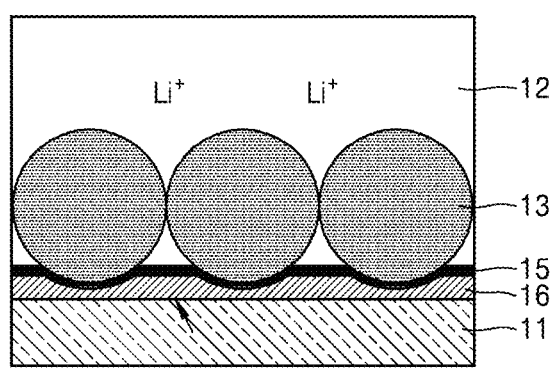
Figure 1G:
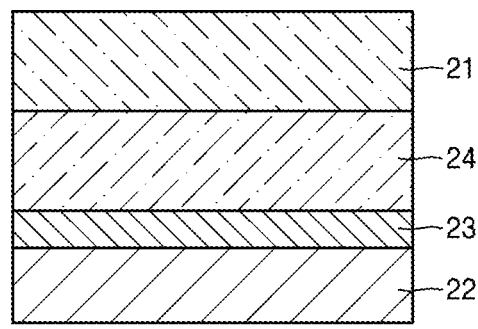
FIGS. 1G to 1K are schematic views illustrating structures of an embodiment of a lithium metal battery.
Figure 1H:
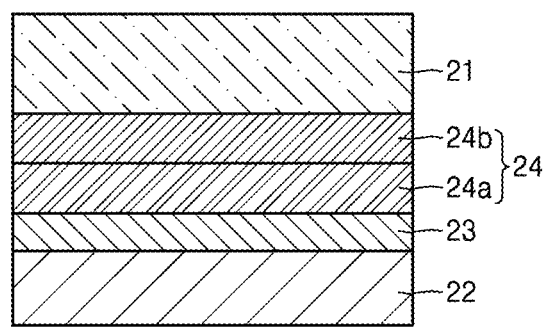
Figure 1I:
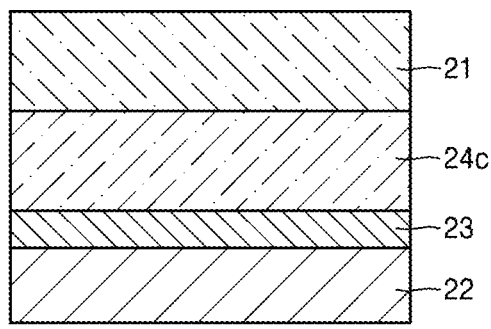
Figure 1J:
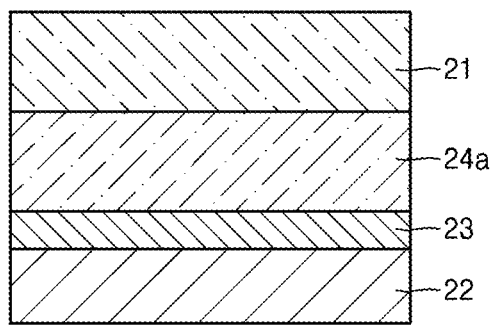
Figure 1K:
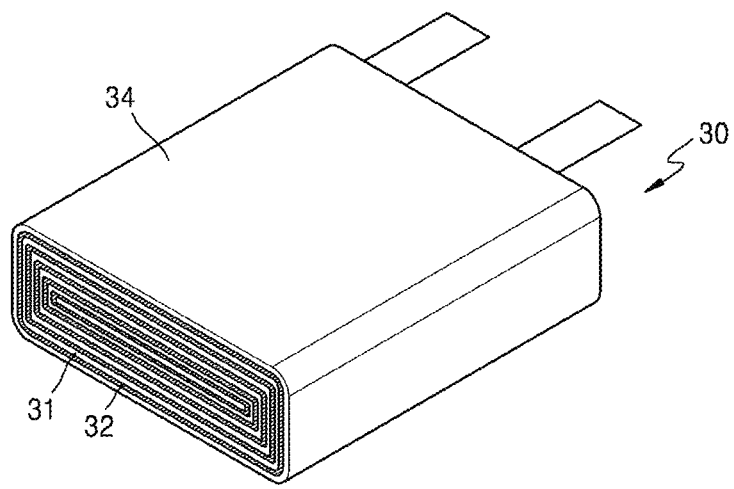
Figure 1L:
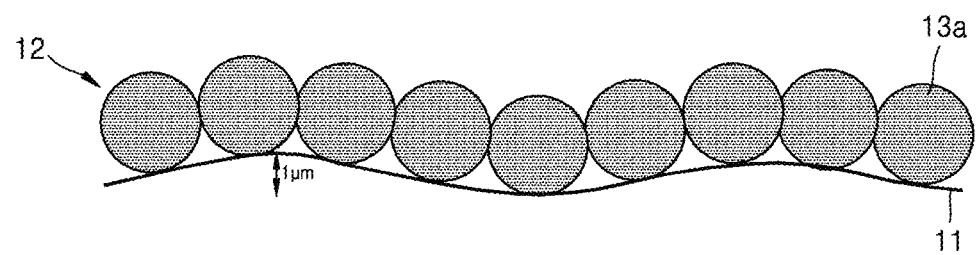
FIG. 1L is a schematic view illustrating an embodiment of a protective function of a protective layer for a lithium metal electrode in a negative electrode for a lithium metal battery according to an embodiment, when microspheres in the protective layer have an average particle diameter of greater than about 1 μm to about 100 μm or less.
Figure 1M:
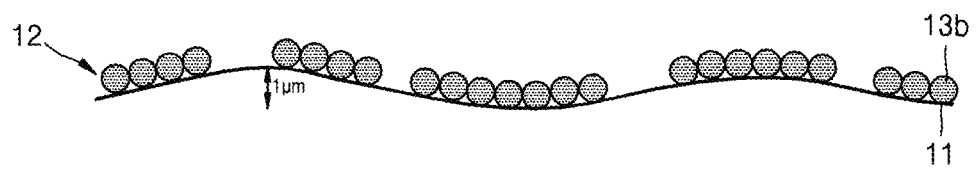
FIG. 1M is a schematic view illustrating an embodiment of a protective function of a protective layer for a lithium metal electrode in a negative electrode for a lithium metal battery, when microspheres in the protective layer have an average particle diameter of about 1 μm or less.

FIG. 1L is a schematic view of a negative electrode for a lithium metal battery according to an embodiment, illustrating a protective function of a protective layer for a lithium metal electrode in the negative electrode, when microspheres in the protective layer have a particle diameter greater than about 1 μm and about 100 μm or less. FIG. 1M is a schematic view of a negative electrode for a lithium metal battery, illustrating a protective function of a protective layer for a lithium metal electrode in a negative electrode for a lithium metal battery when microspheres in the protective layer have an average particle diameter of about 1 μm or less.

Referring to FIG. 1L, a protective layer 12 including microspheres 13a may be stacked on a lithium metal electrode 11. A surface coating fraction of the microspheres 13a in the protective layer 12 of the lithium metal electrode 11 and the gap between the microspheres 13a are factors which directly impact the protective function of the protective layer 12 of the lithium metal electrode 11. The surface coating fraction refers to the portion of the surface of the lithium metal electrode which includes the protective layer relative to a total surface area of the lithium metal electrode. The surface coating fraction may be about 80%, or about 85%, or about 90%, or about 95%, or about 100% of the total surface area of the lithium metal electrode.

The lithium metal electrode 11 may be, for example, a lithium metal. As shown in FIG. 1L, the lithium metal electrode 11 may be thin enough to have soft characteristics. The lithium metal electrode 11 may have a thickness of, for example, about 5 μm to about 50 μm, or about 10 to about 30 μm, or about 15 μm to about 25 μm. The lithium metal electrode 11 may have a surface step difference of about ±1 μm. To protect the lithium metal electrode 11 having such a surface step difference, it may be effective to use the microspheres 13a having an average particle diameter greater than 1 μm to about 100 μm in the protective layer 12.

Meanwhile, as illustrated in FIG. 1M, when the protective layer 12 on the lithium metal electrode 11 includes microspheres having an average particle diameter of about 1 μm or less, for example, about 5 nanometers (nm) to about 300 nm, the aggregation and surface coating fraction of the microspheres may be poor, so that the protective layer 12 may have an increased porosity, and liquid electrolyte may be more likely to contact the lithium metal.

The particle size may mean an average particle diameter when the at least one particle in the protective layer 12 is of a spherical shape, or a length of the major axis when the at least one particle in the protective layer 12 is of a rod shape. For example, when the at least one particle in the protective layer 12 has a rod shape, a minor to major axis ratio of the particle may be, for example, about 1:1 to about 1:30, or about 1:2 to about 1:25, or about 1:5 to about 1:20.

The at least one particle in the protective layer 12 may include any polymer that may be suitable to form protective layers.

In some embodiments, the at least one particle in the protective layer 12 may include a polymer having low wettability against a liquid electrolyte.

The at least one particle in the protective layer 12 may include a polymer including a polystyrene homopolymer, a copolymer including a styrene repeating unit, a copolymer including a repeating unit having a cross-linkable functional group, a cross-linked polymer, or a combination thereof. For example, the at least one particle in the protective layer 12 may be a polymer, e.g., a homopolymer or a copolymer, including a styrene repeating unit. When the at least one particle in the protective layer is a polymer including a styrene repeating unit, which has hydrophobicity and essentially no wettability to the electrolyte, and the polymer does not adversely affect the lithium metal electrode, then the reactivity of the lithium metal electrode with the electrolyte may be suppressed.

The at least one particle may include a polymer including polystyrene, a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, and a poly(acrylonitrile-styrene-(C1-C9 alkyl) acrylate) copolymer, or a combination thereof. The polymer may include a cross-linked polymer. The cross-linked polymer refers to, for example, a poly(styrene-divinylbenzene) copolymer, a poly(methyl methacrylate-divinylbenzene), a cross-linked product of a poly(styrene-divinylbenzene) copolymer, a cross-linked product of a poly(methyl methacrylate-divinylbenzene), or a combination thereof. A combination comprising at least one of the foregoing may also be used. In a copolymer including a styrene repeating unit, the amount of the styrene repeating unit may be from about 65 to 99 parts by weight, and in some embodiments, about 80 to 99 parts by weight, and in some embodiments, about 90 to 99 parts by weight, and in some other embodiments, about 96 to 99 parts by weight, based on 100 parts by weight of the copolymer.

In a copolymer including a divinylbenzene as a repeating unit, the amount of divinylbenzene may be from about 1 to 35 parts by weight, and in some embodiments, about 1 to 20 parts by weight, and in some embodiments, about 1 to 10 parts by weight, and in some other embodiments, about 1 to 4 parts by weight, and in some other embodiments, about 3 to 7 parts by weight, and in still other embodiments, about 5 parts by weight, based on 100 parts by weight of the copolymer.

In each of the above-listed copolymers of poly(methyl methacrylate-divinylbenzene) copolymer, poly(ethyl methacrylate-divinylbenzene) copolymer, poly(pentyl methacrylate-divinylbenzene) copolymer, poly(butyl methacrylate-divinylbenzene) copolymer, and poly(propyl methacrylate-divinylbenzene) copolymer, the amount of the methyl methacrylate, ethyl methacrylate, pentyl methacrylate, butyl methacrylate, or propyl methacrylate repeating unit may be from about 65 to 99 parts by weight, and in some embodiments, about 80 to 99 parts by weight, and in some embodiments, about 90 to 99 parts by weight, and in some other embodiments, about 96 to 99 parts by weight, based on 100 parts by weight of the copolymer.

In each of the above-listed poly(styrene-ethylene-butylene-styrene) copolymer, poly(styrene-methyl methacrylate) copolymer, poly(styrene-acrylonitrile) copolymer, poly(styrene-vinylpyridine) copolymer, poly(acrylonitrile-butadiene-styrene) copolymer, poly(acrylonitrile-ethylene-propylene-styrene) copolymer, poly(methyl methacrylate-acrylonitrile-butadiene-styrene) copolymer, poly((C1-C9 alkyl) methacrylate-butadiene-styrene) copolymer, poly(styrene-(C1-C9 alkyl) acrylate) copolymer, and poly(acrylonitrile-styrene-(C1-C9 alkyl) acrylate) copolymer, the amount of the styrene repeating unit may be from about 65 to 99 parts by weight, and in some embodiments, about 80 to 99 parts by weight, and in some embodiments, about 90 to 99 parts by weight, and in some other embodiments, about 96 to 99 parts by weight, based on 100 parts by weight of the copolymer. When the above-listed copolymers are a ternary or quaternary copolymer, the non-styrene repeating units may be combined in any of a variety of ratios to make up the balance of the copolymer based upon the amount of the styrene repeating units. The above-listed polystyrene copolymers may include a block copolymer, a random copolymer, an alternating copolymer, a graft copolymer, and the like. A combination comprising at least one of the foregoing polystyrene copolymers may also be used. These copolymers may have a weight average molecular weight of about 10,000 Daltons to about 50,000 Daltons.

The weight average molecular weight may be measured by methods known to those of skill in the art. For example, the weight average molecular weight is measured by Gel permeation chromatography (GPC).

In the block copolymer, a block including a first repeating unit may have a weight average molecular weight of about 10,000 Daltons or greater, and in some embodiments, about 10,000 to 510,000 Daltons, in some other embodiments, about 15,000 to about 400,000 Daltons, and in some embodiments about 20,000 to about 200,000 Daltons. The amount of the block including the first repeating unit may be about 20 to 50 parts by weight, or for example, about 20 to about 40 parts by weight, or for example, about 22 to 30 parts by weight, based on 100 parts by weight of the block copolymer. When using such a polymer block, the protective layer may have good mechanical properties, for example, improved strength.

In the block copolymer, a block including a second repeating unit may have a weight average molecular weight of about 10,000 Daltons or greater, and in some embodiments, about 10,000 to 510,000 Daltons, and in some other embodiments, about 15,000 to 400,000 Daltons. The protective layer may have improved ductility, elasticity, and strength characteristics. When using a block having a weight average molecular weight within these ranges, the protective layer may have improved ductility, elasticity, and strength characteristics.

The block copolymer may include a diblock copolymer (A-B), a triblock copolymer (A-B-A' or B-A-B'), or a combination thereof.

The at least one particle in the protective layer may include a polyvinyl pyridine, polyvinyl cyclohexane, polyglycidyl acrylate, poly(2,6-dimethyl-1,4-phenylene oxide), polyolefin, poly(tert-butyl vinyl ether), polycyclohexyl vinyl ether, polyvinyl fluoride, poly(styrene-maleic anhydride) copolymer, polyglycidyl methacrylate, polyacrylonitrile, a polymeric ionic liquid or a combination thereof.

The at least one particle in the protective layer may include a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(methyl acrylate-divinylbenzene) copolymer, a poly(ethyl acrylate-divinylbenzene) copolymer, a poly(pentyl acrylate-divinylbenzene) copolymer, poly(butyl acrylate-divinylbenzene) copolymer, a poly(propyl acrylate-divinylbenzene) copolymer, a poly(pentyl acrylate-divinylbenzene) copolymer, a poly(acrylonitrile-butadiene-styrene) copolymer, or a combination thereof. A combination comprising at least one of the foregoing may also be used.

When the at least one particle in the protective layer includes a cross-linked polymer as described above, individual particles may be connected to each other due to cross-linking between the particles, and as a result, the protective layer may have improved mechanical strength. The protective layer may have a degree of cross-linking of about 10 to 30%, for example, about 12 to 28%, for example about 15% to about 25%.

Structures of negative electrodes for lithium metal batteries, according to exemplary embodiments, will be described with reference to FIGS. 1A to 1D. In FIGS. 1A to 1D, as a non-limiting example, a particle 13 in a protective layer 12 may have a microspheric shape.

Referring to FIG. 1A, a negative electrode according to an embodiment may include a lithium metal electrode 11 on a current collector 10, wherein the lithium metal electrode 11 may include lithium metal or a lithium metal alloy. The protective layer 12 may be on the lithium metal electrode 11. The protective layer 12 may include particles 13 that have gaps (i.e., space) between the particles 13, and ions may be transported through the gaps. Thus, using the protective layer 12, the negative electrode may have improved ion conductivity. Furthermore, the gaps, for example, pores structures between the particles 13, may provide a space for lithium dendritic growth and act as a guide for growth of lithium dendrites.

The lithium metal alloy may include a lithium metal and a metal/metalloid alloyable with lithium metal or an oxide of the metal/metalloid. Examples of the metal/metalloid alloyable with lithium metal or an oxide of thereof include Si, Sn, Al, Ge, Pb, Bi, Sb, a Si—Y alloy (wherein Y is an alkaline metal, an alkaline earth metal, a Group 13 to 16 element, a transition metal, a rare earth element, or a combination thereof, except for Si), a Sn—Y alloy (wherein Y is an alkaline metal, an alkaline earth metal, a Group 13 to 16 element, a transition metal, a rare earth element, or a combination thereof, except for Sn), $MnO_x$ (wherein $0<x\leq2$), or a combination thereof.

Y may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof. For example, the oxide of a metal/metalloid alloyable with lithium metal may be a lithium titanium oxide, a vanadium oxide, a lithium vanadium oxide, $SnO_2$, $SiO_x$ (wherein $0<x<2$), or the like. A combination comprising at least one of the foregoing may also be used.

Referring to FIG. 1B, the particles 13 may be surrounded by an ion conductive polymer 14. Although not illustrated, a liquid electrolyte may be present in the gaps between the particles 13.

The ion conductive polymer 14, which may be in the protective layer 12, may improve the intensity of the protective layer 12, and serve as a binder. The amount of the ion conductive polymer 14 may be about 10 parts by weight or less, and in some embodiments, about 5 parts by weight or less, or about 2 parts by weight or less, and in some other embodiments, may be about 1 to about 10 parts by weight, or about 1 to about 5 parts by weight, or about 1 to about 2 parts by weight, based on 100 parts by weight of the particles 13. When the amount of the ion conductive polymer 14 is within these ranges, the protective layer 12 may have good mechanical strength and effectively suppress growth of lithium dendrites.

The ion conductive polymer 14 may include any material that is capable of acting as a binder for aiding the adhesion of the particles 13 of the protective layer 12 to an upper surface of the lithium metal electrode 11, and may improve the mechanical strength of the protective layer 13. For example, the ion conductive polymer 14 may include any polymer having ion conductive characteristics suitable for use in a lithium metal batteries. The ion conductive polymer 14 includes, for example, a homopolymer, a copolymer, and a cross-linked polymer.

The copolymer as the ion conductive polymer 14 may be a block copolymer, a random copolymer, a graft copolymer, or an alternating copolymer. A combination comprising at least one of the foregoing may also be used.

The cross-linked polymer as the ion conductive polymer 14 may be any polymer having bond which links one polymer chain to another, for example, a polymer prepared by cross-linking of cross-linkable functional groups. The cross-linked polymer as the ion conductive polymer 14 may be a cross-linked product of a copolymer including a cross-linkable functional group as a repeating unit.

The cross-linked polymer as the ion conductive polymer 14 may be a cross-linked product of a block copolymer including a polystyrene block and a polyethylene oxide block having an acrylate functional group; or a cross-linked product of a compound including a (C1-C9 alkyl)(meth)acrylate, C1-C9 alkenyl acrylates, a (C1-C12 glycol) diacrylate, a poly(C2-C6 alkylene glycol) diacrylate, a poly(C2-C9 glycol) polyacrylate, or a combination thereof. Examples of the (C1-C9 alkyl)(meth)acrylates include hexyl acrylate, or 2-ethylhexyl acrylate, and examples of the C1-C9 alkenyl acrylates includes, allyl methacrylate.

Examples of the glycol diacrylates include 1,4-butanediol diacrylate, 1,3-butylene glycol diacrylate, 1,6-hexanediol diacrylate, ethylene glycol diacrylate, neopentyl glycol diacrylate, or a combination thereof. Examples of the polyalkylene glycol diacrylates include diethylene glycol diacrylate, triethylene glycol diacrylate, tetraethylene diacrylate, tripropylene glycol diacrylate, polyethylene glycol diacrylate, polypropyleneglycol acrylate, or a combination thereof.

Examples of the polyol polyacrylates include trimethylol propane triacrylate, pentaerythritol tetraacrylate, pentaerythritol triacrylate, or a combination thereof.

The ion conductive polymer 14 may include polystyrene, a block copolymer including a styrene repeating unit, or a combination thereof. For example, the ion conductive polymer 14 may be at least one selected from polystyrene, a poly(styrene-divinylbenzene) block copolymer, a poly(styrene-isoprene) block copolymer, a poly(styrene-isoprene-styrene) block copolymer, a poly(styrene-butadiene) block copolymer, a poly(styrene-butadiene-styrene) block copolymer, a poly(styrene-ethylene-butylene-styrene) block copolymer, a poly(styrene-methyl methacrylate) block copolymer, a poly(styrene-acrylonitrile) block copolymer, a poly(styrene-vinylpyridine) block copolymer, poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, a poly(acrylonitrile-styrene-(C1-C9 alkyl) acrylate) copolymer, or a combination thereof.

For example, the poly(styrene-divinylbenzene) copolymer may be represented by Formula 1.

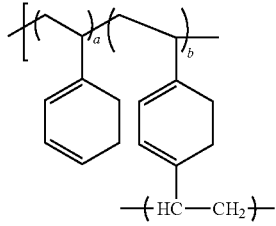

Formula 1

In Formula 1, a and b as mole fractions are each independently 0.01 to 0.99, wherein the sum of a and b is equal to 1. In Formula 1, a may be from 0.95 to 0.99, or 0.96 to 0.99, or for example, from 0.98 to 0.99; and b may be from 0.01 to 0.05, or 0.01 to 0.04, or for example, from 0.01 to 0.02.

For example, the poly(styrene-divinylbenzene) copolymer may be represented by Formula 1a.

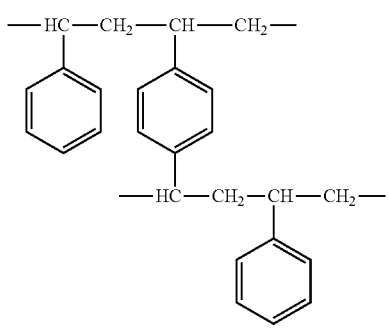

Formula 1a

For example, the poly(styrene-divinylbenzene) copolymer may be represented by Formula 1b.

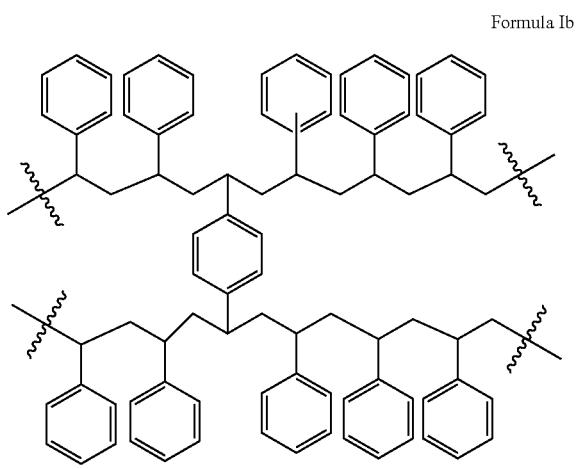

Formula 1b

The poly(acrylonitrile-butadiene-styrene) copolymer may be represented by Formula 2.

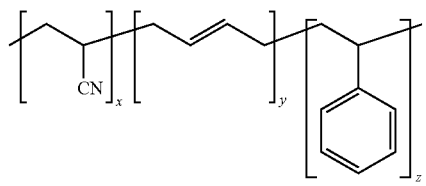

Formula 2

In Formula 2, x, y, and z as mole fractions are each independently from 0.01 to 0.99, wherein the sum of x, y, and z is equal to 1.

In Formula 2, x may be from 0.1 to 0.35, y may be from 0.05 to 0.55, and z may be from 0.2 to 0.7. For example, x may be from 0.15 to 0.35, y may be from 0.05 to 0.3, and z may be from 0.4 to 0.6.

The poly(styrene-divinylbenzene) copolymer represented by Formula 1 and the poly(acrylonitrile-butadiene-styrene) copolymer represented by Formula 2 may each independently have a degree of polymerization of about 2 to about 5,000, or about 3 to about 2,000, or for example, about 5 to about 1,000.

For example, the poly(styrene-divinylbenzene) copolymer represented by Formula 1 and the poly(acrylonitrile-butadiene-styrene) copolymer represented by Formula 2 may be a block copolymer.

In some embodiments, the protective layer 12 may have a single layer structure of the particles 13, as illustrated in FIGS. 1A and 1B.

In some other embodiments, the protective layer 12 may have a double layer structure in which the particles 13 are stacked as a double layer on the lithium metal electrode 11, as illustrated in FIG. 1C. The particles 13 stacked as a double layer may also be surrounded by the ion conductive polymer 14, as illustrated in FIG. 1B.

In some other embodiments, the protective layer 12 may have a multilayer structure in which particles 13a, 13b, and 13c having different sizes may be mixed together, as illustrated in FIG. 1D. When the protective layer 12 has such a multilayer structure in which the particles 13a, 13b, and 13c having different sizes are mixed together, the space for dendritic growth may be suppressed by lowering the porosity or improving the packing density of the protective layer 12, and thereby minimizing contact between the electrolyte and the lithium metal. The dendritic growth may also be suppressed by increasing the thickness of the protective layer 12.

The particles 13 in the protective layer 12 may include, for example, a poly(styrene-divinylbenzene) copolymer. When the particles 13 in the protective layer 12 are formed of a cross-linked polymer as described above, the particles 13 may be chemically linked to one another, and thus form a high-intensity microsphere network structure.

The protective layer 12 may have a porosity of about 25 to about 50%, for example, about 28% to about 48%, or about 30 to about 45%. A pore size and porosity of the protective layer 12 may be determined depending on the size of the particles 13.

In the protective layer 12 according to any of the above-described embodiments, substantially no agglomeration of the particles 13 occurs, so that the protective layer 12 may have a uniform thickness. The protective layer 12 may have a thickness of about 1 μm to about 10 μm, for example about 2 μm to about 9 μm, or for example, about 3 to about 8 μm. A thickness deviation of the protective layer 12 may be from about 0.1 to about 4 μm, and in some embodiments, about 0.1 to about 3 μm, and in some other embodiments, about 0.1 μm to about 2 μm.

The protective layer further includes a liquid electrolyte. The liquid electrolyte includes a lithium salt and an organic solvent. The lithium salt of the liquid electrolyte in the protective layer 12 may include, for example, LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, LiB(C$_2$O$_4$)$_2$, or a combination thereof.

The amount of the lithium salt in the protective layer 12 may be from about 10 to about 70 parts by weight, or about 15 to 60 parts by weight, and in some embodiments, about 20 to about 50 parts by weight, based on 100 parts by weight of the particles 13. When the amount of the lithium salt is within these ranges, the protective layer 12 may have good ion conductivity.

The organic solvent of the liquid electrolyte in the protective layer 12 may be a carbonate compound, a glyme compound, and a dioxolane compound. For example, the carbonate compound may be ethylene carbonate, propylene carbonate, dimethyl carbonate, fluoroethylene carbonate, diethyl carbonate, or ethyl methyl carbonate. A combination comprising at least one of the foregoing may also be used.

The glyme compound may be, for example, poly(ethylene glycol)dimethyl ether (PEGDME; polyglyme), tetra(ethylene glycol)dimethyl ether (TEGDME; tetraglyme), tri(ethylene glycol)dimethyl ether (triglyme), poly(ethylene glycol)dilaurate (PEGDL), poly(ethylene glycol)monoacrylate (PEGMA), poly(ethylene glycol)diacrylate (PEGDA), or a combination thereof.

The dioxolane compound may be, for example, 1,3-dioxolane, 4,5-diethyl-1,3-dioxolane, 4,5-dimethyl-1,3-dioxolane, 4-methyl-1,3-dioxolane, and 4-ethyl-1,3-dioxolane. For example, the organic solvent may be 2,2-dimethoxy-2-phenyl acetophenone, dimethylether (DME), 1,2-dimethoxyethane, 1,2-diethoxyethane, tetrahydrofuran, gamma-butyrolactone, 1,1,2,2-tetrafluoroethyl 2,2,3,3-tetrafluoropropyl ether, or the like, or a combination thereof.

For example, the organic solvent may be ethylene carbonate, propylene carbonate, dimethyl carbonate, diethyl carbonate, ethyl methyl carbonate, fluoroethylene carbonate, gamma-butyrolactone, 1,2-dimethoxyethane, 1,2-diethoxyethane, dimethylene glycol dimethyl ether, trimethylene glycol dimethyl ether, tetramethylene glycol dimethyl ether, polyethylene glycol dimethyl ether, succinonitrile, sulfolane, dimethyl sulfone, ethyl methyl sulfone, diethyl sulfone, adiponitrile, 1,1,2,2-tetrafluoroethyl 2,2,3,3-tetrafluoropropyl ether, or a combination thereof.

FIGS. 1E and 1F are schematic views for explaining the effects of a lithium negative electrode according to an embodiment.

Referring to FIG. 1E, a lithium negative electrode according to an embodiment may have a structure including a protective layer 12 on a lithium metal electrode 11 that has a solid-electrolyte interphase (SEI) 15 thereon, the protective layer 12 including particles 13. The lithium metal electrode 11 and the SEI 15 may have soft characteristics due to, for example, a small thickness thereof, and thus may be pressed down by the particles 13, resulting in the formation of grooves in the lithium metal electrode 11 and the SEI 15.

In FIG. 1E, the particles 13 may include, for example, cross-linked polystyrene microspheres. Without being limited by theory, it is believed that the pressing force exerted by the particles 13 on the lithium metal electrode 11 and the SEI 15, may suppress lithium dendritic growth and guide growth of lithium dendrites into the gaps (spaces) between the particles 13. When a negative electrode including such a protective layer as illustrated in FIG. 1E is charged, lithium deposition may occur to form a lithium deposition layer 16 on the lithium metal electrode 11, as illustrated in FIG. 1F, with the SEI 15 and the protective layer 12 including the particles 13 being stacked in the stated order on the lithium deposition layer 16.

When using the protective layer 12, the lithium deposition density of the negative electrode may be remarkably improved as compared to a negative electrode which does not include the protective layer. In addition, the network and pore structures of the protective layer 12 may serve as spaces for dendritic growth and at the same time control the amount of dendritic growth, and finally may adsorb byproducts from a positive electrode. Thus, a lithium metal battery including such a lithium negative electrode according to any of the above-described embodiments, may have improved lifetime and high-temperature stability.

In some embodiments, a lithium metal battery using a negative electrode according to any of the above-described embodiments may have a lithium deposition density of about 0.2 to 0.3 grams per cubic centimeter (g/cm$^3$, g/cc), for example, about 0.209 to about 0.29 g/cm$^3$, or for example, about 0.201 to 0.280 g/cm$^3$, on the surface of the lithium metal electrode when charged.

In some embodiments, a lithium metal battery including a lithium negative electrode according to any of the above-described embodiments may have a lithium deposition density which is greater than a lithium deposition density of a lithium metal battery which does not include the protective layer (i.e., a lithium metal battery using bare lithium metal as a negative electrode). The lithium negative electrode may have a lithium deposition density which is at least about 50% or greater, or 55% or greater, or 58% or greater, or for example, about 50% to about 75% greater, or about 50 to 60% greater, with respect to a lithium metal battery using bare lithium metal as a negative electrode. This remarkable improvement in lithium deposition density is attributed to the protective layer 12 having high strength in the negative electrode. The protective layer may have a Young's modulus of about 10$^6$ Pa or greater, for example, about 6 to 8 gigapascals (GPa), as measured at about 25° C.

When the protective layer has a Young's modulus within these ranges, the protective layer may effectively suppress volume change in the negative electrode, and the negative electrode may less likely to be partially broken by the formation of lithium dendrites on the surface of the lithium metal electrode and cause a short.

In some embodiments, the protective layer may have a tensile strength of about 2 megapascals (MPa) or greater, or about 5 MPa or greater, or about 10 MPa or greater, as measured at about 25° C. An interfacial resistance between the lithium metal electrode and the protective layer, which may be obtained through an impedance measurement and using a Nyquist plot, may be decreased by at least about 10%, as measured at about 25° C., compared to bare lithium metal. The negative electrode according to any of the above-described embodiments including the protective layer for the lithium metal electrode may have lower interfacial resistance and thus better interfacial characteristics, as compared to a lithium metal electrode not including a protective layer. For example, the negative electrode may have an oxidation current or reduction current of about 0.05 milli- Ampere per square centimeter (mA/cm²) or less in a voltage range of about 0.0 volts (V) to about 6.0 V with respect to lithium metal.

When using a protective layer according to any of the above-described embodiments, a lithium metal battery may be substantially free of battery swelling issues after repeated cycles of charging and discharging.

In some embodiments, the direct contact region between the liquid electrolyte in the protective layer and the lithium metal electrode may be about 30 to 50 volume % based on a total volume of the direct contact region between the protective layer and the lithium metal electrode.

Figure 9A:
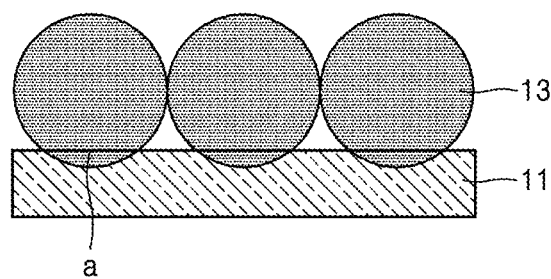
FIGS. 9A to 9C are schematic views of negative electrodes illustrating the arrangement of microsphere particles as a protective layer on a surface of a lithium metal electrode, according to various embodiments.
Figure 9B:
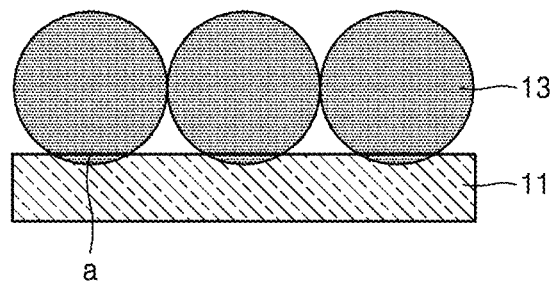
Figure 9C:
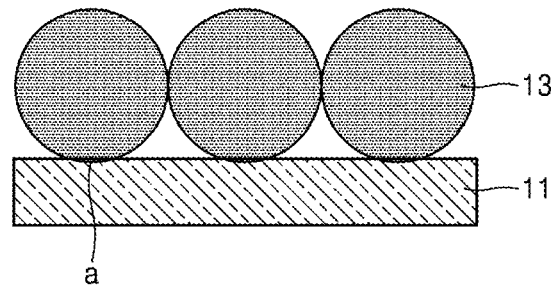

FIGS. 9A to 9C are schematic views of negative electrodes for lithium metal batteries, according to embodiments, illustrating the arrangement of microspheres on an upper surface of a lithium metal electrode 11.

Referring to FIGS. 9A, 9B, and 9C, microspheres 13 having a diameter of about 3 μm may be disposed on the upper surface of the lithium metal electrode 11. In FIGS. 9A to 9B, the microspheres 13 are on the upper surface of the lithium metal electrode 11.

In the embodiments of FIGS. 9A to 9C, the lithium metal electrode 11 may have a length of about 5.4 μm.

In FIGS. 9A, 9B, and 9C, a, which indicates a buried depth of the microspheres 13, is about 1.2 μm, 0.9 μm, and 0.5 μm in the negative electrodes of FIGS. 9A, 9B, and 9C, respectively. The direct contact region between liquid electrolyte in the protective layer and the lithium metal electrode may be about 33.3 volume percent (vol %), 50 vol % and 72.2 vol %, based on a total volume of the direct contact region between the protective layer and the lithium metal electrode in the embodiments of FIGS. 9A, 9B, and 9C, respectively.

A method of manufacturing a negative electrode for a lithium metal battery, according to an embodiment, may be as follows.

First, particles having a size greater than 1 μm and about 100 μm are mixed with a solvent to prepare a protective layer-forming composition.

The protective layer-forming composition may be coated on a lithium metal electrode and dried to form a protective layer, thereby manufacturing the negative electrode for a lithium metal battery.

The solvent may be, for example, tetrahydrofuran, N-methylpyrrolidone, or the like. The amount of the solvent may be from about 100 parts to 5,000 parts by weight based on 100 parts by weight of the particles.

An ion conductive polymer may be further added to the protective layer-forming composition.

At least one selected from an ionic liquid, a polymer ionic liquid (PIL), and a lithium salt may be further added to the protective layer-forming composition.

The coating may be performed using any method suitable for forming a protective layer, for example, spin coating, roll coating, curtain coating, extruding, casting, screen printing, inkjet printing, doctor blade coating, or the like.

The drying may be performed at a temperature of about 20 to 25° C. When the drying is performed at a low temperature within this temperature range, deformation of the lithium metal electrode may not occur. A protective layer having a monodisperse single layer structure may be formed through direct coating of the protective layer-forming composition on the lithium metal electrode, thereby improving efficiency in protective layer formation process. The resulting protective layer may also have good mechanical strength and improved ion conductivity.

The drying may be followed by roll-pressing. This roll-pressing may be performed under the conditions which are suitable roll-pressing conditions for manufacturing batteries in the art. The roll-pressing may be performed, for example, at a pressure of about 1 kilogram force per centimeter (kgf/cm) to about 1.5 kgf/cm.

The protective layer may have an oxidation current or reduction current of about 0.05 mA/cm² or less in a voltage range of about 0.0V to 6.0V with respect to lithium metal. The protective layer may be electrochemically stable in a voltage range of about 0V to 6.0V, and in some embodiments, about 0V to 5.0V, and in some other embodiments, about 0V to 4.0V, with respect to lithium. In some embodiments, the protective layer may have an electrochemically stable wide voltage window, and thus may be applicable to an electrochemical device operating at a high voltage.

The at least one particle in the protective layer may be an organic particle. The organic particle may include, for example, polystyrene, a poly(styrene-divinylbenzene) copolymer, or a combination thereof.

The at least one particle in the protective layer may be an inorganic particle. The inorganic particle may include, for example, $SiO_2$, $TiO_2$, $ZnO$, $Al_2O_3$, $BaTiO_3$, or a combination thereof.

The at least one particle in the protective layer may be an organic-inorganic particle. The organic-inorganic particle may include, for example, a cage-structured silsesquioxane, a metal-organic framework (MOF), or a combination thereof.

For example, the cage-structured silsesquioxane may be a polyhedral oligomeric silsesquioxane (POSS). The number of silicon atoms in the POSS may be about 8 or less, for example, 6, 7, or 8. For example, the cage-structured silsesquioxane may be a compound represented by Formula 3.

$$Si_kO_{1.5k}(R_1)_a(R_2)_b(R_3)_c \quad \text{Formula 3}$$

In Formula 3, $R_1$, $R_2$, and $R_3$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In Formula 3, 0<a<20, 0<b<20, 0<c<20, and k=a+b+c, provided that a, b, and c are selected in such a way that 6≤k≤20.

The cage-structured silsesquioxane may be a compound represented by Formula 4 or a compound represented by Formula 5.

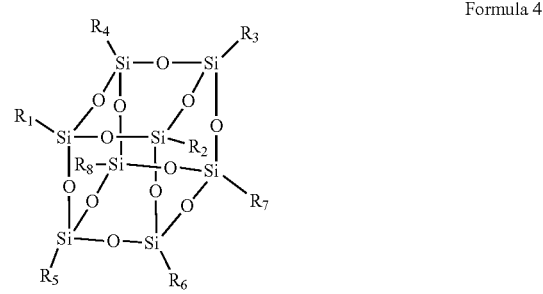

Formula 4

In Formula 4, $R_1$ to $R_8$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

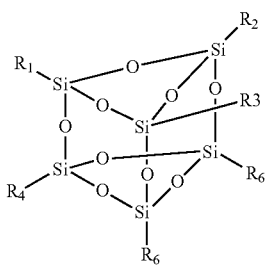

Formula 5

In Formula 5, $R_1$ to $R_6$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In some embodiments, $R_1$ to $R_8$ in Formula 4 and $R_1$ to $R_6$ in Formula 5 each may be an isobutyl group. For example, the cage-structured silsesquioxane may be octaisobutyl-t8-silsesquioxane.

The MOF may be a porous crystalline compound in which a Group 2 to Group 15 metal ion or a Group 2 to Group 15 metal ionic cluster is chemically bonded with an organic ligand. The organic ligand refers to an organic group that may form an organic bond such as a coordinate bond, ionic bond, or covalent bond. For example, an organic group having at least two binding sites for such metal ions as described above may form a stable structure through binding with the metal ions.

The Group 2 to Group 15 metal ion may include cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), bismuth (Bi), or a combination thereof. The organic ligand may be a group derived from a compound including an aromatic dicarboxylic acid, an aromatic tricarboxylic acid, an imidazole-based compound, a tetrazole, 1,2,3-triazole, 1,2,4-triazole, pyrazole, an aromatic sulfonic acid, an aromatic phosphoric acid, an aromatic sulfinic acid, an aromatic phosphinic acid, a bipyridine, or a compound having a functional group including an amino group, an imino group, an amide group, a dithio carboxylic acid group (—$CS_2H$), a dithio carboxylate group (—$CS_2^-$), a pyridine group, or a pyrazine group, or a combination thereof. A combination comprising at least one of the foregoing may also be used.

Non-limiting examples of the aromatic dicarboxylic acid and aromatic tricarboxylic acid are benzene dicarboxylic acid, benzene tricarboxylic acid, biphenyl dicarboxylic acid, and terphenyl-dicarboxylic acid.

For example, the organic ligand may be a group originating from compounds represented by Formula 6.

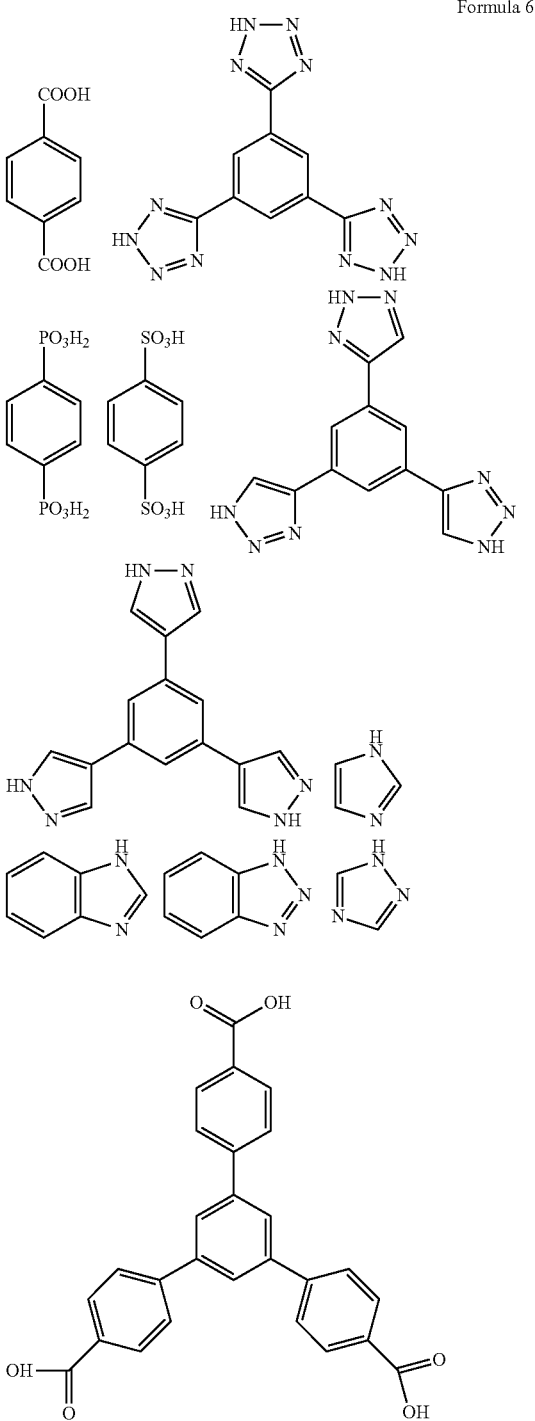

Formula 6

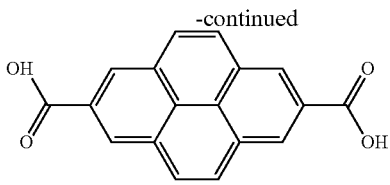

The MOF may be, for example, $Ti_8O_8(OH)_4[O_2C-C_6H_4-CO_2]_6$, Cu (bpy)($H_2O)_2(BF_4)_2$(bpy) {bpy=4,4'-bipyridine}, $Zn_4O(O_2C-C_6H_4-CO_2)_3$ (Zn-terephthalic acid-MOF, Zn-MOF), or $Al(OH)\{O_2C-C_6H_4-CO_2\}$.

The protective layer may include i) a particle A including a cage-structured silsesquioxane, an MOF compound, $Li_{1+x+y}Al_xTi_{2-x}Si_yP_{3-y}O_{12}$ (wherein $0<x<2$ and $0\le y<3$), $BaTiO_3$, $Pb(Zr_pTi_{1-p})O_3$ wherein $0\le p\le 1$ (PZT), $Pb_{1-x}La_xZr_{1-y}Ti_yO_3$ (PLZT, wherein $0\le x<1$ and $0\le y<1$), $Pb(Mg_{1/3}Nb_{2/3})O_3-PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), $Li_xTi_y(PO_4)_3$ (lithium titanium phosphate, wherein $0<x<2$ and $0<y<3$), $Li_xAl_yTi_z(PO_4)_3$ (lithium aluminum titanium phosphate, wherein $0<x<2$, $0<y<1$, and $0<z<3$), $Li_{1+x+y}(Al, Ga)_x(Ti, Ge)_{2-x}Si_yP_{3-y}O_{12}$ (wherein $0\le x\le 1$ and $0\le y\le 1$), and $Li_xLa_yTiO_3$ (lithium lanthanum titanate, wherein $0\le x<2$ and $0<y<3$), $Li_xGe_yP_zS_w$ (lithium germanium thiophosphate, wherein $0\le x<4$, $0<y<1$, $0<z<1$, and $0<w<5$), $Li_xN_y$ (lithium nitride, wherein $0<x<4$ and $0<y<2$), $Li_xSi_yS_z$ (SiS2 glass, wherein $0\le x<3$, $0<y<2$, and $0<z<4$), $Li_xP_yS_z$ ($P_2S_5$ glass, wherein $0\le x<3$, $0<y<3$, and $0<z<7$), $Li_2O$, LiF, LiOH, $Li_2CO_3$, $LiAlO_2$, $Li_2O-Al_2O_3-SiO_2-P_2O_5-TiO_2-GeO_2$, and $Li_{3+x}La_3M_2O_{12}$ (wherein $0\le x\le 5$, and M is Te, Nb, or Zr); ii) a cross-linked product of a particle A having cross-linkable functional groups; or a combination thereof.

The cross-linkable functional group may be any cross-linkable functional group, for example, an acrylate group, a methacrylate group, an epoxy group, or the like, or a combination thereof.

When the at least one particle in the protective layer has a cross-linkable functional group on a surface thereof, the particles may be covalently linked so that the protective layer may have improved mechanical strength.

The ionic liquid which may be added to the protective layer-forming composition refers to a salt in a liquid state at room temperature or a fused salt at room temperature that consists of ions having a melting point equal to or below room temperature. The ionic liquid may be a compound including: i) a cation including an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and ii) an anion including $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, Cl$^-$, Br$^-$, I$^-$, $BF_4^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$, or a combination thereof.

In some embodiments, the ionic liquid may include N-methyl-N-propylpyrrolidinium bis(trifluoromethylsulfonyl)imide, N-butyl-N-methyl-pyrrolidinium bis(3-trifluoromethylsulfonyl)imide, 1-butyl-3-methyl-imidazolium bis(trifluoromethylsulfonyl)imide, 1-ethyl-3-methylimidazolium bis(trifluoromethylsulfonyl)imide, or a combination thereof.

The amount of the ionic liquid may be from about 5 parts by weight to about 40 parts by weight, or from about 7.5 parts by weight to about 30 parts by weight, and in some embodiments, about 10 parts by weight to about 20 parts by weight, based on 100 parts by weight of the particles in the protective layer. When the amount of the ionic liquid is within these ranges, the protective layer may have improved ion conductivity and improved mechanical properties.

When the protective layer includes an ionic liquid (IL) and a lithium salt, the mole ratio (IL/Li) of the ionic liquid to lithium ions may be about 0.1 to 2.0, and in some embodiments, about 0.2 to 1.8, and in some other embodiments, about 0.4 to 1.5. When the mole ratio of the ionic liquid to lithium ions is within these ranges, the protective layer may have high lithium ion mobility, high ion conductivity, and improved mechanical properties to effectively suppress growth of lithium dendrite on a surface of the negative electrode.

The polymer ionic liquid which may be added to the protective layer-forming composition may be, for example, a polymerization product of ionic liquid monomers, or a polymeric compound. The polymer ionic liquid is highly dissoluble in an organic solvent, and thus may further improve the ion conductivity of a polymer layer when added to the protective layer-forming composition.

When the polymer ionic liquid is prepared by polymerization of ionic liquid monomers as described above, a resulting product from the polymerization reaction may be washed and dried, followed by an anionic substitution reaction to have appropriate anions that may improve solubility in an organic solvent In some embodiments, the polymer ionic liquid may include a repeating unit that includes: i) a cation including an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and ii) an anion including $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, Cl$^-$, Br$^-$, I$^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

In some embodiments, the polymer ionic liquid may be prepared by polymerization of ionic liquid monomers. For example, the ionic liquid monomers may have a polymerizable functional group such as a vinyl group, an allyl group, an acrylate group, or a methacrylate group, and may include a cation including an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, or a combination thereof, and at least one of the above-listed anions.

Non-limiting examples of the ionic liquid monomers are 1-vinyl-3-ethylimidazolium bromide, a compound represented by Formula 7, or a compound represented by Formula 8.

Formula 7

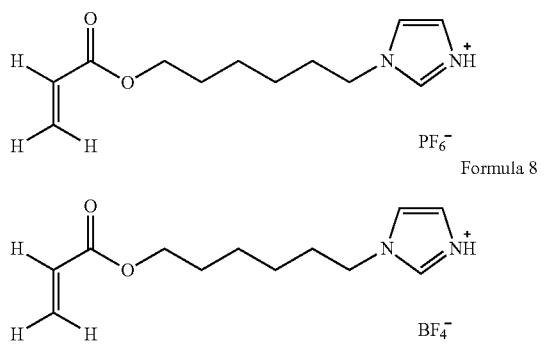

Formula 8

For example, the polymer ionic liquid may be a compound represented by Formula 9 or a compound represented by Formula 10.

Formula 9

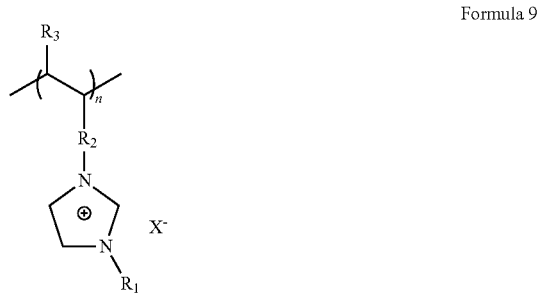

In Formula 9, $R_1$ and $R_3$ may be each independently a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group;
$R_2$ may be a chemical bond, a C1-C30 alkylene group, a C6-C30 arylene group, a C2-C30 heteroarylene group, or a C4-C30 divalent carbocyclic group;
$X^-$ indicates an anion of the ionic liquid; and
n may be from about 500 to 2800.

[Formula 10]

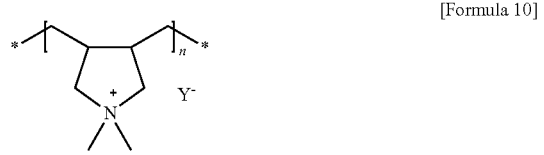

In Formula 10, $Y^-$ may be an anion of the ionic liquid 9; and n may be 500 to 2800.

For example, in Formula 10, $Y^-$ may be bis(trifluoromethylsulfonyl)imide (TFSI), bis(fluorosulfonyl)imide, $BF_4$, or $CF_3SO_3$.

The polymeric ionic liquid may include, for example a cation including poly(1-vinyl-3-alkylimidazolium), poly(1-allyl-3-alkylimidazolium), or poly(1-(methacryloyloxy-3-alkylimidazolium), and an anion including $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, or $(CF_3SO_2)(CF_3CO)N^-$.

For example, the compound of Formula 10 may be poly(diallyldimethyl ammonium bis(trifluoromethylsulfonyl)imide).

In some embodiments, the polymer ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme are polyethyleneglycol dimethylether (polyglyme), tetraethyleneglycol dimethyl ether (tetraglyme), and triethyleneglycol dimethylether (triglyme).

The low-molecular weight polymer may have a weight average molecular weight of about 75 to about 2000 Daltons, or about 100 to about 1000 Daltons, or for example, a weight average molecular weight of about 250 to about 500 Daltons. The thermally stable ionic liquid may be the same as those listed above in conjunction with the above-described ionic liquid.

The protective layer may further include an oligomer. For example, the oligomer in the protective layer may include polyethylene glycol dimethyl ether, polyethylene glycol diethyl ether, or a combination thereof. The oligomer may have a weight average molecular weight of about 200 to about 2,000 Daltons, or about 300 to about 1800 Daltons, or about 400 to about 1500 Daltons. The amount of the oligomer may be about 5 parts by weight to about 50 parts by weight, or about 10 parts by weight to about 40 parts by weight, or about 10 parts by weight to about 30 parts by weight, based on 100 parts by weight of the particles in the protective layer. When such an oligomer is added, the protective layer may have further improved film formability, mechanical properties, and ion conductivity characteristics.

The protective layer may have an ion conductivity as measured at about 25° C. of about $1 \times 10^{-4}$ Siemens per centimeter (S/cm) or greater, and in some embodiments, about $5 \times 10^{-4}$ S/cm or greater, and in some other embodiments, about $1 \times 10^{-3}$ S/cm or greater.

The protective layer of the negative electrode according to any of the above-described embodiments may be applicable to a lithium metal battery, for example, a lithium air battery, a lithium ion battery, or a lithium polymer battery, or the like.

In some embodiments, the protective layer may be suitable as a protective layer for a high-voltage lithium secondary battery. The term "high-voltage" refers to a charging voltage of about 4.0 V to 5.5 V.

According to another embodiment of the present disclosure, there is provided a lithium metal battery including a positive electrode, the negative electrode according to any of the above-described embodiments, and an electrolyte between the positive and negative electrodes.

The electrolyte may include a liquid electrolyte, a solid electrolyte, a gel electrolyte, a polymer ionic liquid, or a combination thereof. For example, the electrolyte may be a mixed electrolyte including at least one of these electrolytes. The lithium metal battery may further include a separator.

The at least one selected from a liquid electrolyte, a polymeric ionic liquid, a gel electrolyte, and a solid electrolyte may be between the positive electrode and the electrolyte. The gel electrolyte may be any gel electrolyte known in the art. For example, the gel electrolyte may include a polymer and a polymer ionic liquid. For example, the polymer may be a solid graft (block) copolymer electrolyte.

The solid electrolyte may be, for example, an organic solid electrolyte or an inorganic solid electrolyte. Non-limiting examples of the organic solid electrolyte are polyethylene derivatives, polyethylene oxide derivatives, polypropylene oxide derivatives, phosphoric acid ester polymer, polyester sulfide, polyvinyl alcohol, polyfluoride vinylidene, and polymers including ionic dissociative groups. A combination comprising at least one of the foregoing may also be used.

Non-limiting examples of the inorganic solid electrolyte are $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S.GeS_2.Ga_2S_3$, $Li_2O.11Al_2O_3$, $(Na,Li)_{1+x}Ti_{2-x}Al_x(PO_4)_3$ (wherein $0.1 \leq x \leq 0.9$), $Li_{1+x}Hf_{2-x}Al_x(PO_4)_3$ (wherein $0.1 \leq x \leq 9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, sodium silicates, $Li_{0.3}La_{0.5}TiO_3$, $Na_5MSi_4O_{12}$ (wherein M is a rare earth element, for example, Nd, Gd, Dy, or the like) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein $x \leq 0.8$, $0 \leq y \leq 1.0$, and M is Nd, Sm, Eu, Gd, Tb, Dy, Ho, Er, Tm, or Yb), $Li_{1+x+y}Q_xTi_{2-x}Si_yP_{3-y}O_{12}$ (wherein $0 < x \leq 0.4$, $0 \leq y \leq 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M is Nb or Ta), and $Li_{7+x}A_xLa_{3-x}Zr_2O_{12}$ (wherein $0 < x < 3$ and A is Zn). A combination comprising at least one of the foregoing may also be used.

In some embodiments, the protective layer of the negative electrode in the lithium metal battery may include a metal salt containing a Group 1 or Group 2 element and a nitrogen-containing additive; boron nitride; or a combination thereof.

The metal salt containing a Group 1 or Group 2 element may include Cs, Rb, K, Ba, Sr, Ca, Na, Mg, or a combination thereof. The nitrogen-containing additive may include an inorganic nitrate, an organic nitrate, an inorganic nitrite, an organic nitrite, an organic nitro compound, an organic nitroso compound, a N—O compound, a lithium nitride ($Li_3N$), or a combination thereof.

The metal salt containing a Group 1 or Group 2 element and a nitrogen-containing additive may be insoluble in an organic solvent of a liquid electrolyte of the electrolyte. Due to these insoluble characteristics, the metal salt containing a Group 1 or Group 2 element and a nitrogen-containing additive, when included in the protective layer, may be stably confined to a surface region of the lithium metal electrode with limited mobility, so that migration of lithium ions between electrodes may not be hindered.

The metal of the metal salt containing a Group 1 or Group 2 element has a relatively larger atom size than lithium and thus may have a steric hindrance effect in the protective layer. Due to this steric hindrance, the metal salt containing a Group 1 or Group 2 element is able to suppress growth of lithium dendrites on the surface of the lithium metal electrode. A metal cation (for example, cesium (Cs) or rubidium (Rb) ions) in the metal salt containing a Group 1 or Group 2 element may exhibit an effective reduction potential below the reduction potential of lithium ions and thus may form a positively charged electrostatic shield around the initial growth tip of protuberances formed on the surface of the lithium metal electrode without reduction or deposition of the metal salt during lithium deposition. The positively charge electrostatic shield may effectively suppress growth of lithium dendrites on the surface of the lithium metal electrode. In order for the metal salt containing a Group 1 or Group 2 element to have an effective reduction potential below the reduction potential of lithium ions, as described above, the amount of the metal salt containing a Group 1 or Group 2 is within a certain range. For example, the amount of the metal salt containing a Group 1 or Group 2 element may be controlled to be within a range of about 0.1 part by weight to about 100 parts by weight, or about 1 part by weight to about 75 parts by weight, or about 10 parts by weight to about 50 parts by weight, based on 100 parts by weight of the particles in the protective layer.

The protective layer of the negative electrode in the lithium metal battery may have good mechanical strength and flexibility to suppress lithium dendritic formation. The lithium metal battery may further include an ion-conductive thin film between the lithium metal electrode and the protective layer. The ion-conductive thin film may improve the ion conductivity of the protective layer and lithium ion mobility (or lithium ion transference number), and thus reduce an interfacial resistance between the lithium metal electrode and the protective layer. For example, the ion-conductive thin film may include lithium nitride ($Li_3N$).

The protective layer of the negative electrode in the lithium metal battery may also chemically improve a deposition/dissolution process of lithium ions to thus thereby improve deposition morphology of the lithium metal electrode compared to when forming a conventional protective layer, and consequently increase deposition density on the surface of the lithium metal electrode and lithium ion mobility (or transference number). In addition, as described above, the metal salt containing a Group 1 or Group 2 element and a nitrogen-containing additive is confined to the protective layer on the surface of the lithium metal electrode, and thus is unlikely to be dispersed in the liquid electrolyte or to migrate toward the positive electrode and react with the positive electrode. As a result, the lithium metal battery including the protective layer may have improved rate capability and lifetime characteristics.

For example, the nitrogen-containing additive in the protective layer may include an inorganic nitrate, an organic nitrate, an inorganic nitrite, an organic nitrite, an organic nitro compound, an organic nitroso compound, a N—O compound, lithium nitride ($Li_3N$), or a combination thereof. However, the nitrogen-containing additive is not limited thereto.

For example, the inorganic nitrate may include lithium nitrate, potassium nitrate, cesium nitrate, barium nitrate, ammonium nitrate, or a combination thereof. For example, the organic nitrate may include dialkyl imidazolium nitrate, guanidine nitrate, ethyl nitrate, propyl nitrate, butyl nitrate, pentyl nitrate, octyl nitrate, or a combination thereof. For example, the organic nitrite may include ethyl nitrite, propyl nitrite, butyl nitrite, pentyl nitrite, octyl nitrite, or a combination thereof.

For example, the organic nitro compound may include nitromethane, nitropropane, nitrobutane, nitrobenzene, dinitrobenzene, nitrotoluene, dinitrotoluene, nitropyridine, or a combination thereof. For example, the N—O compound may include pyridine N-oxide, alkylpyridine N-oxide, tetramethyl piperidine N-oxyl (TEMPO), or a combination thereof.

In an embodiment, the nitrogen-containing additive in the protective layer may comprise $LiNO_3$, $Li_3N$, or a combination thereof, and the Group 1 element- or Group 2 element-containing metal salt in the protective layer may comprise cesium bis(trifluoromethylsulfonyl)imide (CsTFSI), $CsNO_3$, $CsPF_6$, CsFSI, $CsAsF_6$, $CsClO_4$, $CsBF_4$, or a combination thereof. For example, the metal salt containing a Group 1 or Group 2 element may be CsTFSI.

The amount of the at least one of a metal salt containing a Group 1 or Group 2 element and a nitrogen-containing additive in the protective layer may be from about 0.1 part by weight to about 100 parts by weight, or about 0.1 part by weight to about 50 parts by weight, and in some embodiments, about 0.1 part by weight to about 30 parts by weight, based on 100 parts by weight of the particles in the protective layer. When the amount of the at least one of a metal salt containing a Group 1 or Group 2 element and a nitrogen-containing additive is within any of these ranges, the lithium metal battery may have a lithium dendritic growth suppression effect, a reduced interfacial resistance between the surface of the lithium metal electrode and the protective layer, and improved lithium ion mobility.

In some embodiments, the protective layer may include only a metal salt containing a Group 1 or Group 2 element. In this regard, the amount of the metal salt containing a Group 1 or Group 2 element may be about 0.1 part by weight to about 100 parts by weight, or about 0.1 part by weight to about 50 parts by weight, and in some embodiments, about 0.1 part by weight to about 30 parts by weight, based on 100 parts by weight of the particles in the protective layer.

In some embodiments, the protective layer may include only a nitrogen-containing additive. In this regard, the amount of the nitrogen-containing additive may be about 0.1 part by weight to about 100 parts by weight, or about 0.1 part by weight to about 50 parts by weight, and in some embodiments, about 0.1 part by weight to about 30 parts by weight, based on 100 parts by weight of the particles in the protective layer.

In some other embodiments, the protective layer may include both a metal salt containing a Group 1 or Group 2 element, and a nitrogen-containing additive. In this regard, the amount of the metal salt containing a Group 1 or Group 2 element may be about 0.01 part by weight to about 99.99 parts by weight, and in some embodiments, about 0.05 part by weight to about 50 parts by weight, or about 0.1 part to about 30 part by weight, based on 100 parts by weight of the particles in the protective layer. The amount of the nitrogen-containing additive may be about 0.01 part by weight to about 99.99 parts by weight, or about 0.05 part by weight to about 50 parts by weight, and in some embodiments, about 0.1 part to about 30 parts by weight, based on 100 parts by weight of the particles in the protective layer.

In some embodiments, a mixed weight ratio of the metal salt containing a Group 1 or Group 2 element to the nitrogen-containing additive in the protective layer may be about 1:9 to about 9:1, and in some other embodiments, about 1:2 to about 2:1, and in some other embodiments, about 1:1. When the mixed weight ratio of the metal salt containing a Group 1 or Group 2 element to the nitrogen-containing additive is within any of these ranges, due to good deposition density on the surface of the lithium metal electrode and improved lithium ion mobility characteristics in the electrolyte, the lithium metal battery may have improved rate capability and lifetime characteristics.

The lithium metal electrode of the negative electrode in the lithium metal battery may be a lithium metal or a lithium metal alloy. The lithium metal battery may further include a liquid electrolyte between the negative electrode and the positive electrode, the liquid electrolyte including at least one selected from an organic solvent, an ionic liquid, and a lithium salt.

A lithium metal battery with improved capacity retention rate may be manufactured using a negative electrode according to any of the above-described embodiments. The lithium metal battery according to any one of the above-described embodiments may have good voltage characteristics, high capacity, and high energy density, and thus may be used in a wide variety of applications including mobile phones, laptop computers, storage batteries for power generating units using wind power or sunlight, electric vehicles, uninterruptable power supplies (UPS), household storage batteries, and the like.

FIGS. 1G to 1J are schematic views illustrating structures of lithium metal batteries according to embodiments.

Referring to FIG. 1G, a lithium metal battery according to an embodiment may have a structure including a positive electrode 21, a negative electrode 22 according to any of the above-described embodiments, and an electrolyte 24 between the positive electrode 21 and the negative electrode 22. A protective layer 23 may be between the electrolyte 24 and the negative electrode 22. The electrolyte 24 may include a liquid electrolyte, a polymeric ionic liquid, a solid electrolyte, a gel electrolyte, or a combination thereof. The lithium metal battery may further include a separator.

The protective layer 23 may be disposed on at least a portion of the negative electrode 22, so that the surface of the negative electrode 22 may become mechanically and electrochemically stable. As a result, during charging and discharging the lithium metal battery, dendritic formation on the surface of the negative electrode 22 may be suppressed, and interfacial stability between the negative electrode 22 and the electrolyte 24 may be improved. Thus, the lithium metal battery may have improved cycle characteristics.

The electrolyte 24 may have a two-layer stack structure including a liquid electrolyte 24a and a solid electrolyte 24b that may be sequentially stacked, as illustrated in FIG. 1H. The liquid electrolyte 24a may be adjacent to the protective layer 23. The lithium metal battery may have a stack structure of negative electrode/protective layer/electrolyte (liquid electrolyte/solid electrolyte)/positive electrode, in the stated order.

Referring to FIG. 1I, a lithium metal battery according to another embodiment may further include a separator 24c. For example, the separator may be a monolayer of polyethylene, polypropylene, polyvinylidene fluoride, or a combination thereof, or a multilayer including at least two layers of polyethylene, polypropylene, polyvinylidene fluoride, or a combination thereof. For example, the separator may be a mixed multilayer structure, such as a two-layer separator of polyethylene/polypropylene, a three-layer separator of polyethylene/polypropylene/polyethylene, or a three-layer separator of polypropylene/polyethylene/polypropylene. The separator may include an electrolyte including a lithium salt and an organic solvent.

Referring to FIG. 1J, a lithium metal battery according to another embodiment may include a liquid electrolyte 24a. The liquid electrolyte 24a may have a composition which is the same or different as the composition of the liquid electrolyte included in the protective layer 23.

FIG. 1K is a schematic view illustrating a structure of a lithium metal battery 30 according to another embodiment.

The lithium metal battery 30 may include a positive electrode 31, a negative electrode 32 according to any of the above-described embodiments, and a battery case 34 accommodating the positive electrolyte 31 and the negative electrode 32.

In the embodiments of FIGS. 1G to 1K, the positive electrode 21 may be a porous positive electrode. The porous positive electrode may be a positive electrode including pores, or any positive electrode that allows permeation of liquid electrolyte thereinto by capillary action.

For example, the porous positive electrode may be a positive electrode that may be obtained by coating a cathode active material composition including a positive active material, a conducting agent, a binder, and a solvent, and drying the resulting structure. The resulting positive electrode may include pores among particles of the positive active material. The porous positive electrode may be impregnated with liquid electrolyte.

In some embodiments, the positive electrode may include a liquid electrolyte, a gel electrolyte, or a solid electrolyte. The liquid electrolyte, the gel electrolyte, and the solid electrolyte may be any electrolytes for lithium metal batteries that do not react with the positive active material, and thus prevent deterioration of the positive active material during charging and discharging.

Each element of a lithium metal battery including a negative electrode according to any of the embodiments, and a method of manufacturing the lithium metal battery now will be described in detail.

A positive active material for the positive electrode may include lithium cobalt oxide, lithium nickel cobalt manganese oxide, lithium nickel cobalt aluminum oxide, lithium iron phosphate, lithium manganese oxide, or a combination thereof, but is not limited thereto. Any suitable positive active material may be used.

For example, the positive active material may be a compound represented by one of the following formulae: $Li_aA_{1-b}B_bD_2$ (wherein $0.90 \leq a \leq 1.8$, and $0 \leq b \leq 5$); $Li_aE_{1-b}B_bO_{2-c}D_c$ (wherein $0.90 \leq a \leq 1.8$, $0 \leq b \leq 0.5$, and $0 \leq c \leq 0.05$); $LiE_{2-b}B_bO_{4-c}D_c$ (wherein $0 \leq b \leq 0.5$, and $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.5$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$. A combination comprising at least one of the foregoing may also be used.

In the formulae above, A includes nickel (Ni), cobalt (Co), manganese (Mn), or a combination thereof; B includes aluminum (Al), nickel (Ni), cobalt (Co), manganese (Mn), chromium (Cr), iron (Fe), magnesium (Mg), strontium (Sr), vanadium (V), a rare earth element, or a combination thereof; D includes oxygen (O), fluorine (F), sulfur (S), phosphorus (P), or a combination thereof; E includes cobalt (Co), manganese (Mn), or a combination thereof; F includes fluorine (F), sulfur (S), phosphorus (P), or a combination thereof; G includes aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), or a combination thereof; I includes chromium (Cr), vanadium (V), iron (Fe), scandium (Sc), yttrium (Y), or a combination thereof; and J includes vanadium (V), chromium (Cr), manganese (Mn), cobalt (Co), nickel (Ni), copper (Cu), or a combination thereof.

For example, the positive active material may be a compound represented by Formula 11, a compound represented by Formula 12, or a compound represented by Formula 13.

$Li_aNi_bCo_cMn_dO_2$      Formula 11

In Formula 11, $0.90 \leq a \leq 1.8$, $0 \leq b \leq 0.9$, $0 \leq c \leq 0.5$, and $0 \leq d \leq 0.5$.

$Li_2MnO_3$      Formula 12

$LiMO_2$      Formula 13

In Formula 13, M may be Mn, Fe, Co, or Ni.

The positive electrode of the lithium metal battery may be manufactured as follows.

A positive active material, a binder, and a solvent are mixed to prepare a positive active material composition. A conducting agent may be further added into the positive active material composition. The positive active material composition is directly coated on a metallic current collector and dried to prepare a positive electrode plate. Alternatively, the positive active material composition may be cast on a separate support to form a positive active material film, which may then be separated from the support and laminated on a metallic current collector to prepare a positive electrode plate.

The binder is a composition that facilitates binding between an active material and a conductive material and binding with a current collector. Non-limiting examples of the binder include polyvinylidene fluoride (PVDF), polyvinyl alcohol, carboxymethylcellulose (CMC), starch, hydroxypropylcellulose, reproduced cellulose, polyvinylpyrrolidone, polytetrafluoroethylene, polyethylene, polypropylene, ethylene-propylene-diene terpolymer (EPDM), sulfonated EPDM, styrene butadiene rubber, fluorine rubber, and various copolymers. An amount of the binder added may be from about 1 part by weight to about 50 parts by weight based on 100 parts by weight, based on the total weight of the positive active material. The amount of the binder may be from about 2 parts by weight to about 5 parts by weight based on 100 parts by weight of the total weight of the positive active material. When the content of the binder is within this range, a binding force of the positive active material layer to the current collector may be satisfactory.

The conducting agent may be any material that does not cause a chemical change in the lithium metal battery and which has electrical conductivity. Non-limiting examples of the conducting agent include graphite such as natural graphite or artificial graphite; carbonaceous materials, such as carbon black, acetylene black, Ketjen black, channel black, furnace black, lamp black, or summer black; conductive fibers, such as carbon fibers or metal fibers; carbon fluoride; metal powder, such as aluminum or nickel powder; conductive whisky, such as zinc oxide or potassium titanate; a conductive metal oxide, such as a titanium oxide; and a conductive material, such as a polyphenylene derivative. A combination comprising at least one of the foregoing may also be used.

The amount of the conducting agent may be from about 1 part by weight to about 10 parts by weight, for example, from about 2 parts by weight to about 5 parts by weight, based on 100 parts by weight of the positive active material. When the amount of the conducting agent is within these ranges, the final positive electrode may have good conductivity characteristics.

A Non-Limiting Example of the Solvent is N-Methylpyrrolidone

The amount of the solvent may be from about 100 parts to about 2,000 parts by weight based on 100 parts by weight of the positive active material. When the amount of the solvent is within this range, a process for forming the positive active material layer may be easily carried out.

The amounts of the positive active material, the conducting agent, the binder, and the solvent may be determined by the person of skill in the art without undue experimentation. At least one of the conducting agent, the binder, and the solvent may be omitted depending on the use and structure of a lithium metal battery.

The negative electrode may be, for example, a lithium metal thin film or a lithium metal alloy thin film, as described above.

A lithium metal alloy for the negative electrode may include lithium, and a metal/metalloid alloyable with lithium. Examples of the metal/metalloid alloyable with lithium are Si, Sn, Al, Ge, Pb, Bi, Sb, a Si—Y ally (wherein Y is an alkaline metal, an alkaline earth metal, a Group 13 to Group 16 element, a transition metal, a rare earth element, or a combination thereof, except for Si), a Sn—Y alloy (wherein Y is an alkaline metal, an alkaline earth metal, a Group 13 to Group 16 element, a transition metal, a rare earth element, or a combination thereof, except for Sn). Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

The electrolyte may include a separator and/or a lithium salt-containing nonaqueous electrolyte which are suitable for use in lithium metal batteries in the art.

The separator may be an insulating thin film having high ion permeability and high mechanical strength. The separator may have a pore diameter of about 0.01 µm to about 10 µm, and a thickness of about 5 µm to about 20 µm. Non-limiting examples of the separator are olefin-based polymers, such as polypropylene, and sheets or non-woven fabric made of glass fiber or polyethylene. When a lithium metal battery contains a solid polymer electrolyte, the solid polymer electrolyte may also serve as the separator.

For example, the separator may be a monolayer or a multilayer including at least two layers of polyethylene, polypropylene, polyvinylidene fluoride, or a combination thereof. For example, the separator may be a mixed multilayer, such as a two-layer separator of polyethylene/polypropylene, a three-layer separator of polyethylene/polypropylene/polyethylene, or a three-layer separator of polypropylene/polyethylene/polypropylene. The separator may include an electrolyte including a lithium salt and an organic solvent.

The lithium salt-containing nonaqueous electrolyte may include a nonaqueous electrolyte and a lithium salt. The nonaqueous electrolyte may be a nonaqueous liquid electrolyte, an organic solid electrolyte, or an inorganic solid electrolyte.

The nonaqueous liquid electrolyte may include an organic solvent. The organic solvent may be any suitable organic solvent. For example, the organic solvent may be propylene carbonate, ethylene carbonate, fluoroethylene carbonate, butylene carbonate, dimethyl carbonate, diethyl carbonate, methyl ethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, 1,3-dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, dimethyl ether, or a combination thereof.

For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO2)(C_yF_{2y+1}SO_2)$ (wherein x and y are natural numbers), LiCl, LiI, or a combination thereof. For example, to improve charge-discharge characteristics and resistance to flame in a lithium metal battery, pyridine, triethylphosphate, triethanolamine, cyclic ether, ethylene diamine, n-glyme, hexamethyl phosphoramide, nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, aluminum trichloride, or a combination thereof, may be added to the nonaqueous electrolyte. In some embodiments, to provide nonflammable characteristics, a halogen-containing solvent such as carbon tetrachloride, ethylene trifluoride, or the like may be further added to the nonaqueous electrolyte.

For example, the lithium metal battery according to any one of the above-described embodiments may have improved capacity and improved lifetime characteristics, and thus may be used in a battery cell for use as a power source of a small device. The lithium metal battery may also be used as a unit battery of a medium-large size battery pack or battery module that include a plurality of battery cells for use as a power source of a medium-large size device.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but are not limited thereto.

As used herein, the term "alkyl" refers to a completely saturated branched or unbranched (or straight-chained or linear) hydrocarbon group having the specified number of carbon atoms and having a valence of at least one. Non-limiting examples of the "alkyl" group include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxyl group, a C6-C20 heteroaryloxyalkyl group, or a C6-C20 heteroarylalkyl group.

The term "halogen atom" indicates fluorine, bromine, chlorine, iodine, and the like.

As used herein, the term "alkenyl" group indicates a branched or unbranched hydrocarbon group that includes at least one carbon-carbon double bond and has a valence of at least one. Non-limiting examples of the alkenyl group are vinyl, allyl, butenyl, isopropenyl, and isobutenyl. At least one hydrogen atom in the alkenyl group may be substituted with any of the substituents for the alkyl group as described above as long as the valence of the alkenyl group is not exceeded.

As used herein, the term "alkynyl" indicates a branched or unbranched hydrocarbon group with at least one carbon-carbon triple bond. Non-limiting examples of the "alkynyl" group are ethynyl, butynyl, isobutynyl, and propynyl. At least one hydrogen atom of the "alkynyl" group may be substituted with any of the substituents for the alkyl group as described above.

The term "aryl" means a cyclic group in which all ring members are carbon and at least one ring is aromatic. More than one ring may be present and any additional rings may be independently aromatic, saturated, or partially unsaturated, and may be fused, pendant, spirocyclic or a combination thereof. Non-limiting examples of the "aryl" group are phenyl, naphthyl, and tetrahydronaphthyl. At least one hydrogen atom of the "aryl" group may be substituted with any of the substituents for the alkyl group as described above.

As used herein, the term "heteroaryl" group indicates a monocyclic or bicyclic organic group that includes one or more aromatic rings, in which at least one ring member is a heteroatom selected from nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms. Non-limiting examples of the heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazole-5-yl, tetrazolyl, pyridine-2-yl, pyridine-3-yl, pyrazine-2-yl, pyrazine-4-yl, pyrazine-5-yl, pyrimidine-2-yl, pyrimidine-4-yl, and pyrimidin-5-yl.

The term "heteroaryl" includes a heteroaromatic ring that is selectively fused to at least one of an aryl group, a cycloaliphatic group, and a heterocyclic group.

As used herein, the term "carbocyclic" group indicates a saturated or partially unsaturated non-aromatic monocyclic, bicyclic or tricyclic hydrocarbon group. Non-limiting examples of the monocyclic hydrocarbon group are cyclopentyl, cyclopentenyl, cyclohexyl, and cyclohexenyl. Non-limiting examples of the bicyclic hydrocarbon group are bornyl, decahydronaphthyl, bicyclo[2.1.1]hexyl, bicyclo[2.2.1]heptyl, bicyclo[2.2.1]heptenyl, or bicyclo[2.2.2]octyl. A non-limiting example of the tricyclic hydrocarbon is adamantyl.

As used herein, the term "heterocyclic" group indicates a C5-C20 cyclic hydrocarbon group, for example, C5-C10 cyclic group, including at least one hetero atom. For example, the at least one hetero atom is selected from S, N, O, and B.

As used herein, the terms "alkoxy," "aryloxy," and "heteroaryloxy," indicate alkyl, aryl, and heteroaryl groups, respectively, which are bound to an oxygen atom.

One or more embodiments of the present disclosure will now be described in further detail with reference to the following examples. However, these examples are only for illustrative purposes and are not intended to limit the scope of the one or more embodiments of the present disclosure.

EXAMPLES

Example 1: Manufacture of Negative Electrode

Poly(styrene-b-divinylbenzene) copolymer microspheres (having an average particle diameter of about 3 µm, available from EPRUI Nanoparticles & Microspheres Co., Ltd.) were added to anhydrous tetrahydrofuran to obtain a 5 weight percent (wt %)-block copolymer-containing mixture.

The block copolymer in the block copolymer-containing mixture included a polystyrene block and a polydivinylbenzene block in a mixed ratio of about 80:20 (4:1) by weight, and the poly(styrene-b-divinylbenzene) copolymer had a weight average molecular weight of about 100,000 Daltons.

Lithium bis(fluorosulfonyl)imide (LiFSI, $LiN(SO_2F)_2$) was added to the block copolymer-containing mixture to obtain a protective layer-forming composition. The amount of LiFSI was about 30 parts by weight based on 100 parts by weight of the poly(styrene-b-divinylbenzene) copolymer.

The protective layer-forming composition was coated on a lithium metal thin film (having a thickness of about 20 µm) to a thickness of about 3 µm with a doctor blade, dried at about 25° C., and then further dried in a vacuum at about 40° C. for about 24 hours, thereby to form a negative electrode with a protective layer on the lithium metal thin film.

Examples 2 and 3: Manufacture of Negative Electrodes

Negative electrodes were manufactured in the same manner as in Example 1, except that the thicknesses of the protective layers were changed to about 1 µm and about 8 µm, respectively.

Example 4: Manufacture of Negative Electrode

A negative electrode was manufactured in the same manner as in Example 1, except that a poly(acrylonitrile-b-butadiene-b-styrene) block copolymer was further added to the protective layer-forming composition.

The amount of the poly(acrylonitrile-b-butadiene-b-styrene) copolymer was about 2 parts by weight based on 100 parts by weight of the poly(styrene-b-divinylbenzene) copolymer. The poly(acrylonitrile-b-butadiene-b-styrene) copolymer had a weight average molecular weight of about 100,000 Daltons, and had a mixed weight ratio of a polyacrylonitrile block, a polybutadiene block, and a polystyrene block of about 25:25:50.

Example 5: Manufacture of Negative Electrode

A negative electrode was manufactured in the same manner as in Example 4, except that the amount of the poly(acrylonitrile-b-butadiene-b-styrene) copolymer was changed to 1 part by weight based on 100 parts by weight of the poly(styrene-b-divinylbenzene) copolymer.

Examples 6 and 7: Manufacture of Negative Electrodes

A negative electrode was manufactured in the same manner as in Example 1, except that the poly(styrene-b-divinylbenzene) copolymer microspheres had an average particle diameter of about 1.3 µm and about 8 µm, respectively.

Example 8: Manufacture of Negative Electrode

A negative electrode was manufactured in the same manner as in Example 1, except that poly(styrene-b-divinylbenzene) copolymer microspheres including a polystyrene block and a polydivinylbenzene block in a mixed weight ratio of about 98:2 (49:1) were used.

Example 9: Manufacture of Lithium Metal Battery

The protective layer-forming composition prepared in Example 1 was coated on a lithium metal thin film (having at a thickness of about 20 μm) to a thickness of about 5 μm with a doctor blade, dried at about 25° C., and thermally treated in a vacuum at about 40° C., to form a negative electrode with a protective layer on the lithium metal thin film.

$LiCoO_2$, a conducting agent (Super-P; Timcal Ltd.), polyvinylidene fluoride (PVdF), and N-methylpyrrolidone were mixed together to obtain a positive active material layer-forming composition. A mixed weight ratio of $LiCoO_2$, the conducting agent, and PVdF in the positive active material layer-forming composition was about 97:1.5:1.5. The amount of N-methylpyrrolidone was about 137 g with respect to 97 g of $LiCoO_2$.

The positive active material layer-forming composition was coated on an aluminum foil (having a thickness of about 15 μm), dried at about 25° C., and further dried in a vacuum at about 110° C., to manufacture a positive electrode.

The positive electrode and the negative electrode (having a thickness of about 20 μm) manufactured according to the above-described processes were assembled with a polyethylene separator (having a porosity of about 48%) therebetween, to manufacture a lithium metal battery (pouch cell).

A liquid electrolyte was added between the positive electrode and the negative electrode. The liquid electrolyte was an electrolyte including 1.0M $LiN(SO_2F)_2$ (LiFSI) in a mixed solvent of 1,2-dimethoxyethane (DME) and 1,1,2,2-tetrafluoroethyl 2,2,3,3-tetrafluoropropyl ether (TTE) in a volume ratio of about 2:8.

Examples 10 to 16: Manufacture of Lithium Metal Batteries

Lithium metal batteries were manufactured in the same manner as in Example 9, except that the negative electrodes of Examples 2 to 8 were used, respectively, instead of the negative electrode of Example 1.

Example 17: Manufacture of Lithium Metal Battery

A lithium metal battery was manufactured in the same manner as in Example 12, except that $LiNi_{0.6}Co_{0.2}Al_{0.2}O_2$, instead of $LiCoO_2$, was used to prepare the positive active material layer-forming composition.

Example 18: Manufacture of Negative Electrode

A negative electrode was manufactured in the same manner as in Example 1, except that poly(styrene-b-divinylbenzene) copolymer microspheres having an average particle diameter of about 50 μm were used.

Example 19: Manufacture of Negative Electrode

A negative electrode was manufactured in the same manner as in Example 1, except that poly(styrene-b-divinylbenzene) copolymer microspheres including a polystyrene block and a polydivinylbenzene block in a mixed weight ratio of about 95:5, instead of 80:20, were used.

Examples 20 and 21: Manufacture of Lithium Metal Batteries

Lithium metal batteries were manufactured in the same manner as in Example 9, except that the negative electrodes of Examples 18, and 19, instead of the negative electrode of Example 1, were used, respectively.

Example 22: Manufacture of Negative Electrode

A negative electrode was manufactured in the same manner as in Example 1, except that a 1:1 mixture (by weight) of poly(styrene-b-divinylbenzene) copolymer microspheres having an average particle diameter of about 3 μm and poly(styrene-b-divinylbenzene) copolymer microspheres having an average particle diameter of about 8 μm was used, instead of using only poly(styrene-b-divinylbenzene) copolymer microspheres having an average particle diameter of about 3 μm.

Example 23: Manufacture of Lithium Metal Battery

A negative electrode was manufactured in the same manner as in Example 1, and a lithium metal battery was manufactured in the same manner as in Example 9 by using the negative electrode, except that a 1:1:1 mixture (by weight) of poly(styrene-b-divinylbenzene) copolymer microspheres having average particle diameters of about 3 μm, 3.09 μm, and 2.91 μm was used, instead of poly(styrene-b-divinylbenzene) copolymer microspheres having an average particle diameter of about 3 μm.

Example 24: Manufacture of Lithium Metal Battery

A negative electrode was manufactured in the same manner as in Example 1, and a lithium metal battery was manufactured in the same manner as in Example 9 by using the negative electrode, except that a 1:1:1 mixture (by weight) of poly(styrene-b-divinylbenzene) copolymer microspheres having average particle diameters of about 3 μm, 2.82 μm, and 3.18 μm was used, instead of poly(styrene-b-divinylbenzene) copolymer microspheres having an average particle diameter of about 3 μm.

Example 25: Manufacture of Lithium Metal Battery

A negative electrode was manufactured in the same manner as in Example 1, and a lithium metal battery was manufactured in the same manner as in Example 9 by using the negative electrode, except that a 1:1:1 mixture (by weight) of poly(styrene-b-divinylbenzene) copolymer microspheres having average particle diameters of about 3 μm, 2.7 μm, and 3.3 μm was used, instead of poly(styrene-b-divinylbenzene) copolymer microspheres having an average particle diameter of about 3 μm.

Example 26: Manufacture of Negative Electrode

A negative electrode was manufactured in the same manner as in Example 1, except that a 9:1 mixture (by weight) of poly(styrene-b-divinylbenzene) copolymer microspheres having a particle diameter of about 8 μm and poly(styrene-b-divinylbenzene) copolymer microspheres having an average particle diameter of about 3 μm was used, instead of poly(styrene-b-divinylbenzene) copolymer microspheres having an average particle diameter of about 3 μm.

Example 27: Manufacture of Negative Electrode

A negative electrode was manufactured in the same manner as in Example 1, except that a 9:1 mixture (by weight) of poly(styrene-b-divinylbenzene) copolymer microspheres having an average particle diameter of about 3 µm and poly(styrene-b-divinylbenzene) copolymer microspheres having an average particle diameter of about 1.3 µm was used, instead of poly(styrene-b-divinylbenzene) copolymer microspheres having an average particle diameter of about 3 µm.

Example 28: Manufacture of Lithium Metal Battery

A negative electrode was manufactured in the same manner as in Example 1, and a lithium metal battery was manufactured in the same manner as in Example 9 by using the negative electrode, except that a 1:1:1 mixture (by weight) of poly(styrene-b-divinylbenzene) copolymer microsphere having average particle diameter of about 50 µm was used, instead of poly(styrene-b-divinylbenzene) copolymer microspheres having an average particle diameter of about 3 µm.

Example 29: Manufacture of Lithium Metal Battery

A negative electrode was manufactured in the same manner as in Example 1, and a lithium metal battery was manufactured in the same manner as in Example 9 by using the negative electrode, except that a 1:1:1 mixture (by weight) of poly(styrene-b-divinylbenzene) copolymer microsphere having average particle diameters of about 100 µm was used, instead of poly(styrene-b-divinylbenzene) copolymer microspheres having an average particle diameter of about 3 µm.

Comparative Example 1: Manufacture of Lithium Metal Battery $LiCoO_2$, a conducting agent (Super-P; Timcal Ltd.), PVdF, and N-methylpyrrolidone were mixed together to obtain a positive active material layer-forming composition. A mixed weight ratio of $LiCoO_2$, the conducting agent, and PVdF in the positive active material layer-forming composition was about 97:1.5:1.5.

The positive active material layer-forming composition was coated on an aluminum foil (having a thickness of about 15 µm), dried at about 25° C., and further dried in a vacuum at about 110° C., to manufacture a positive electrode.

The positive electrode manufactured according to the above-described processes and a lithium metal electrode (having a thickness of about 20 µm) were assembled with a polyethylene separator (having a porosity of about 48%) therebetween, thereby to manufacture a lithium metal battery. A liquid electrolyte was added between the positive electrode and the lithium metal electrode.

The liquid electrolyte was an electrolyte including 1.0M $LiN(SO_2F)_2$ (LiFSI) in a mixed solvent of 1,2-dimethoxyethane (DME) and 1,1,2,2-tetrafluoroethyl 2,2,3,3-tetrafluoropropyl ether (TTE) in a volume ratio of about 2:8.

Comparative Example 2

Polystyrene was added to anhydrous tetrahydrofuran to obtain a 5 wt %-polystyrene-including mixture. The polystyrene had a weight average molecular weight of about 100,000 Daltons.

Lithium bis(fluorosulfonyl)imide (LiFSI, $LiN(SO_2F)_2$) was added to the polystyrene-including mixture to obtain a protective layer-forming composition. The amount of LiFSI was about 30 parts by weight based on 100 parts by weight of the polystyrene.

The protective layer-forming composition was coated on a lithium metal thin film (having a thickness of about 20 µm) to a thickness of about 3 µm with a doctor blade, dried at about 25° C., and then further dried in a vacuum at about 40° C. for about 24 hours, thereby to form a negative electrode with a protective layer on the lithium metal thin film.

Comparative Examples 3 and 4

Negative electrodes with protective layer were manufactured in the same manner as in Example 1, except that poly(styrene-b-divinylbenzene) copolymer microspheres having an average particle diameter of about 1 µm and about 0.2 µm, were used, respectively, to obtain the protective layer-forming composition.

Evaluation Example 1: Scanning Electron Microscopic (SEM) Analysis

1) Example 1 and 4

Surface status of each of the negative electrodes of Examples 1 and 4 was analyzed using scanning electron microscopy (SEM).

Figure 2A:
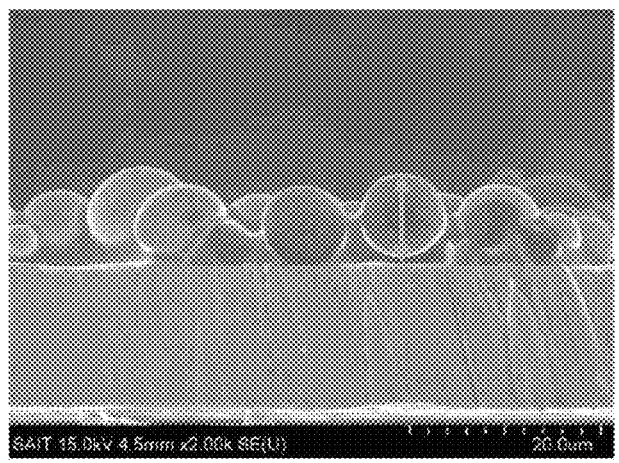
FIGS. 2A to 2D are scanning electron microscopic (SEM) images of the negative electrode of Example 1.
Figure 2B:
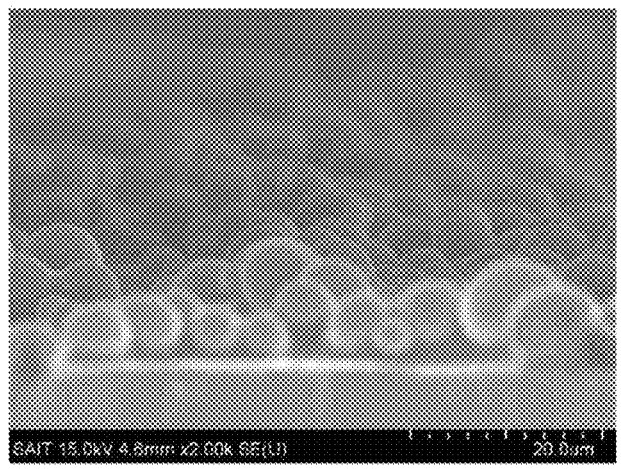
Figure 2C:
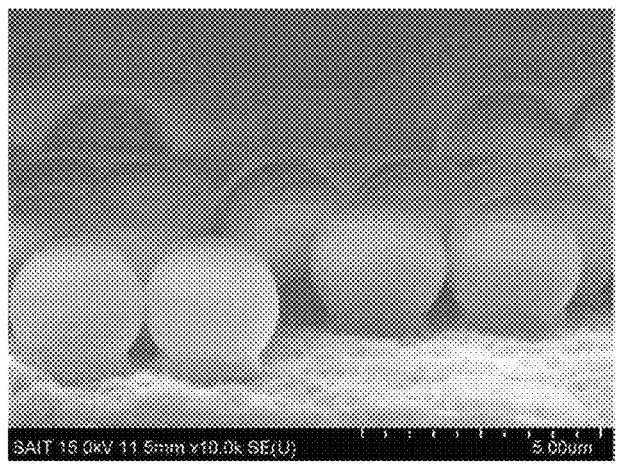
Figure 2D:
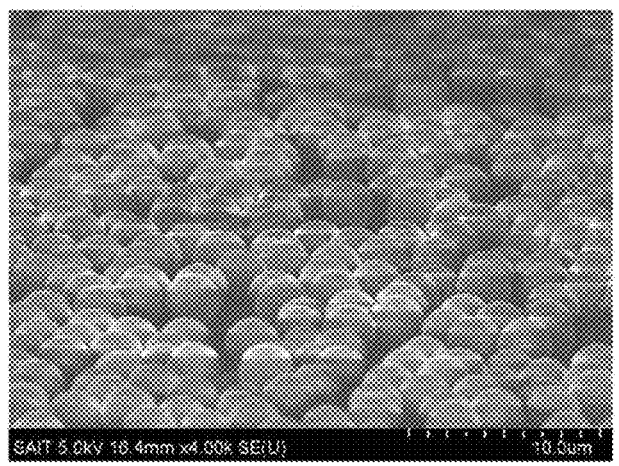
Figure 3A:
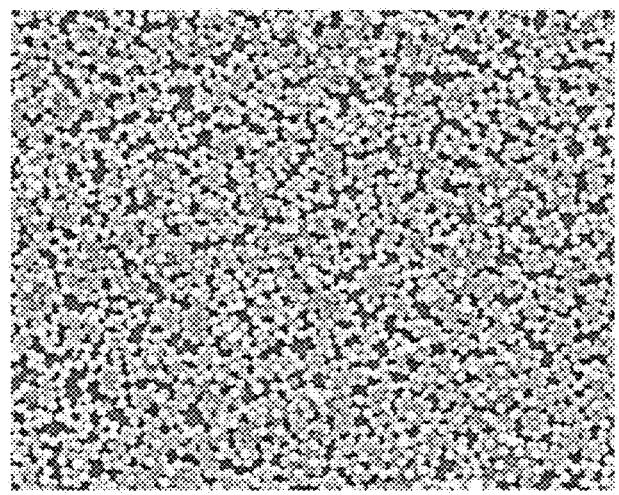
FIGS. 3A to 3C are SEM images of the negative electrode of Example 4.
Figure 3B:
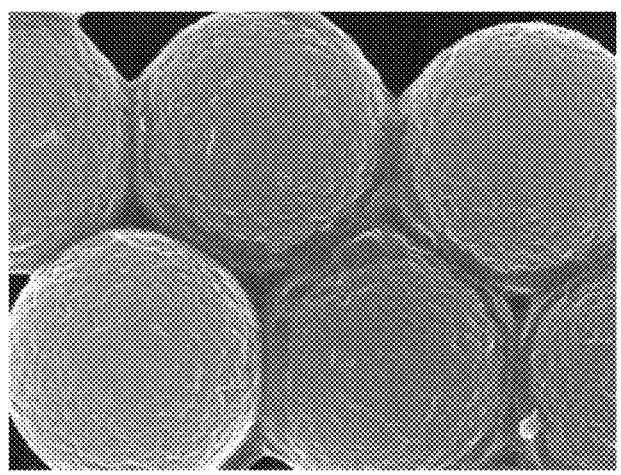
Figure 3C:
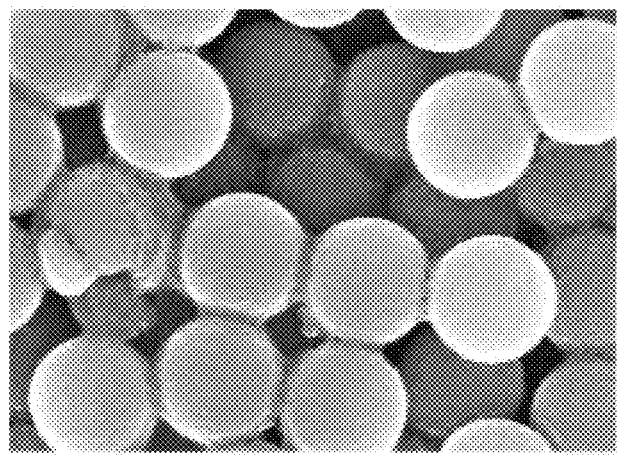

SEM images of the negative electrode of Example 1 are shown in FIGS. 2A and 2D, and SEM images of the negative electrode of Example 4 are shown in FIGS. 3A to 3C.

Referring to FIGS. 2A to 2D, the negative electrode of Example 1 was found to have a single layer structure of microspheres on a surface of the lithium metal thin film. Due to this arrangement of the microspheres, no aggregation of the microspheres occurred.

Referring to FIGS. 3A to 3C, in the negative electrode of Example 4, the protective layer on a surface of the lithium metal thin film was found to have a monodisperse single layer structure of microspheres in closed packed arrangement. The protective layer of FIG. 3A was a monodisperse single layer, and the protective layers of FIGS. 3b and 3C had a double-layer structure.

2) Example 22

Surface status of the negative electrode of Example 22 was analyzed using SEM. An SEM image of the negative electrode of Example 22 is shown in FIG. 3D.

Figure 3D:
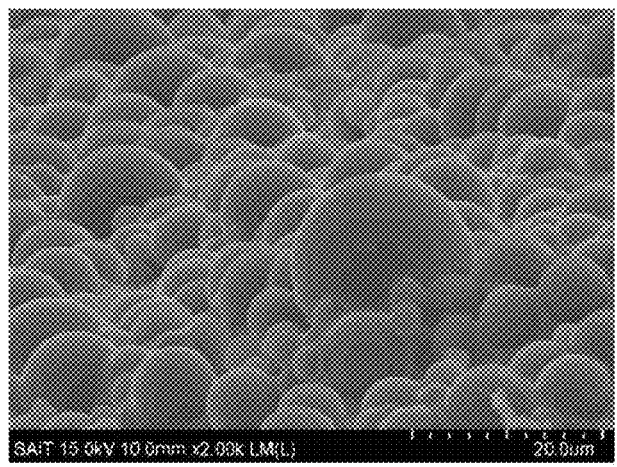
FIG. 3D is an SEM image of the negative electrode of Example 22.

Referring to FIG. 3D, the negative electrode of Example 22 was found to include uniformly dispersed microspheres of the two different sizes on the lithium metal thin film.

Evaluation Example 2: Lithium Deposition Density and SEM Analysis

1) Examples 9, 12, 28, and 29 and Comparative Examples 1 to 4

Each of the lithium metal batteries of Example 9, Example 12, Example 28, Example 29, and Comparative Examples 1 to 4 was charged with a constant current of 0.1 C (0.38 mA/cm$^2$) at about 25° C. until a voltage of about 4.40 V (with respect to Li), and maintained at a constant voltage of 4.40 V (constant voltage mode) until a cutoff current of 0.05 C rate. This one-time charging was followed by measuring external pouch thickness changes in the lithium metal batteries and a thickness deviation in a lithium deposition layer of each of the lithium metal batteries with a lithium micrometer. The results are shown in Table. 1. Lithium deposition density was also evaluated by measuring the thickness of the lithium deposition layer on the negative electrode of each of the lithium metal batteries. The results are shown in Table 2.

TABLE 1

| Example | Change in external pouch thickness (μm) | Thickness deviation of lithium deposition layer (μm) |
|---|---|---|
| Example 9 | 38-40 | ±3 |
| Example 12 | 30-31 | ±3 |
| Comparative Example 1 | 50-60 | ±10 |
| Comparative Example 2 | 50 | ±10 |
| Comparative Example 3 | 42-43 | ±3 |
| Comparative Example 4 | 46-48 | ±5 |

Referring to Table 1, the lithium metal batteries of Examples 9 and 12 were found to have a small change in external pouch thickness, compared to the lithium metal batteries of Comparative Examples 1 to 4. Also, the lithium metal batteries of Examples 9 and 12 were found to have a reduced thickness deviation of the lithium deposition layer, compared to the lithium metal batteries of Comparative Examples 1, 2, and 4.

The lithium metal batteries of Examples 9 and 12 were found to have an increased thickness uniformity at different measurement points, compared to the lithium metal batteries of Comparative Examples 1 to 4.

The lithium metal batteries of Examples 28 and 29 were found to have a small change in external pouch thickness, compared to the lithium metal batteries of Comparative Examples 1 to 4.

TABLE 2

| Example | Lithium deposition density (g/cc or g/cm³) | Thickness of lithium deposition layer (μm) |
|---|---|---|
| Example 9 | 0.207-0.225 | 35-38 |
| Example 12 | 0.260-0.270 | 28-30 |
| Comparative Example 1 | 0.134-0.161 | 45 |
| Comparative Example 2 | 0.134 | 50 |
| Comparative Example 3 | 0.18-0.20 | 39-41 |
| Comparative Example 4 | 0.17-0.18 | 44-46 |

Referring to Table 2, the lithium metal batteries of Examples 9 and 12 were found to have a higher lithium deposition density by about 50% or greater, compared to the lithium deposition density of the lithium metal battery of Comparative Example 1. Also, the lithium metal batteries of Examples 9 and 12 were found to have an increased deposition density, compared to those of the lithium metal batteries of Comparative Examples 2 to 4 and to have a reduced thickness of the lithium deposition layer compared to those of the lithium metal batteries of Comparative Examples 1 to 4.

After each of the lithium metal batteries of Example 9 and Comparative Example 1 was charged with a constant current of 0.1 C rate at about 25° C. until a voltage of about 4.40 V (with respect to Li), a cross-section status of each of the lithium metal electrodes, on which a lithium deposition layer was formed, was analyzed using SEM.

Figure 4A:
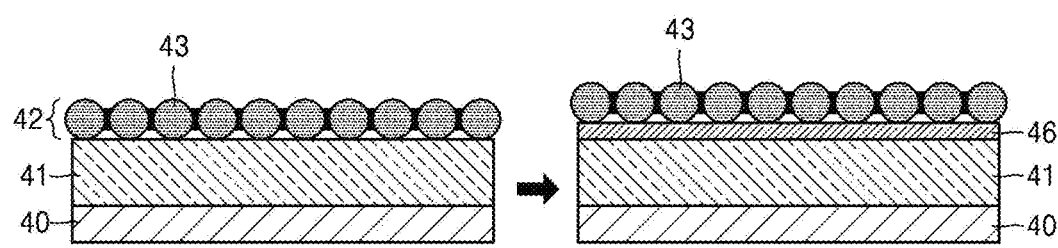
FIG. 4A is a schematic view illustrating the structure of a lithium metal battery of Example 9, in which the negative electrode of the lithium metal battery was formed on a copper thin film used as a negative electrode current collector.
Figure 5A:
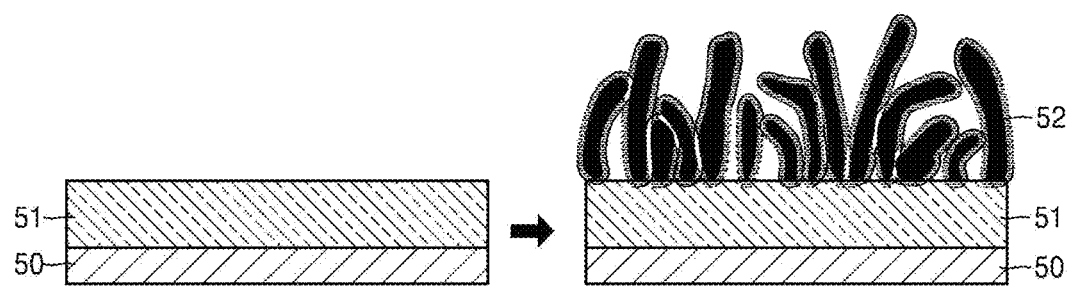
FIG. 5A is a schematic view illustrating the structure of the lithium metal battery of Comparative Example 1, in which a negative electrode of the lithium metal battery was formed on a copper thin film used as a negative electrode current collector.

FIGS. 4A and 5A are schematic views of the lithium metal batteries of Example 9 and Comparative Example 1, respectively, in which the lithium negative electrode of each of the lithium metal batteries was formed on a copper thin film used as a negative electrode current collector.

Referring to FIG. 4A, the negative electrode of the lithium metal battery of Example 9 had a stack structure in which a lithium metal electrode 41 was formed on a negative electrode current collector 40, and a protective layer 42 including polystyrene microspheres 43 was stacked on the lithium metal electrode 41.

Figure 4B:
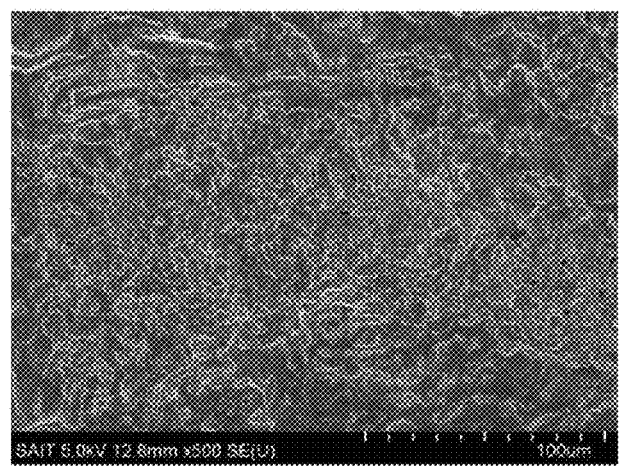
FIGS. 4B and 4C are SEM images of the surface of the negative electrode in the lithium metal battery of Example 9.
Figure 4C:
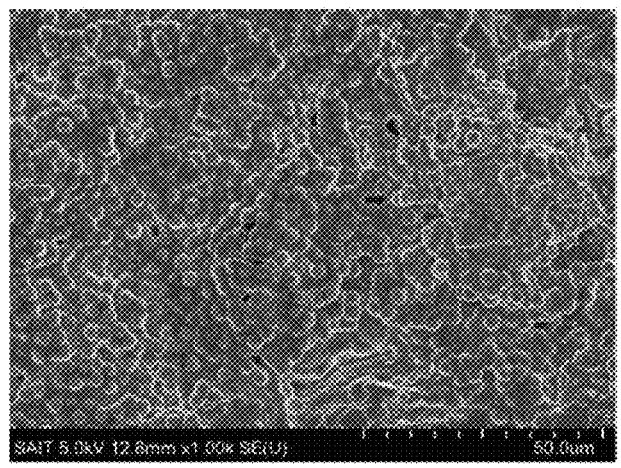
Figure 4D:
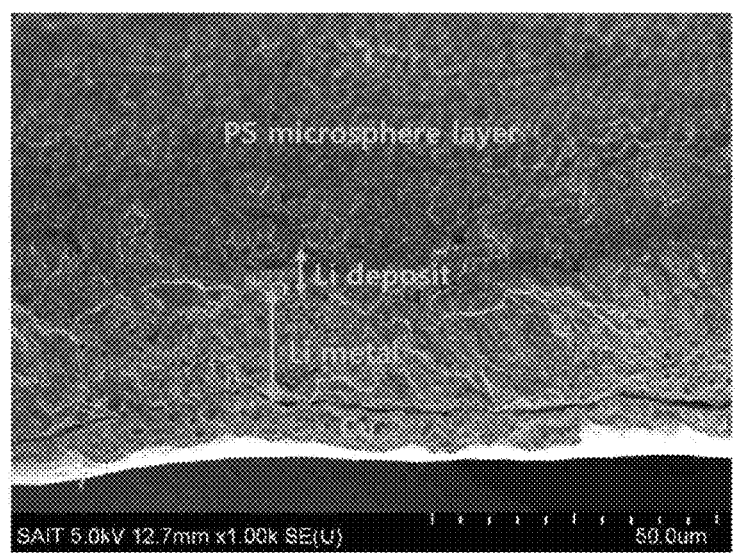
FIG. 4D is an SEM image of a cross-section of the lithium metal battery of Example 9, which shows a lithium deposition layer formed on the negative electrode of the lithium metal battery.
Figure 5B:
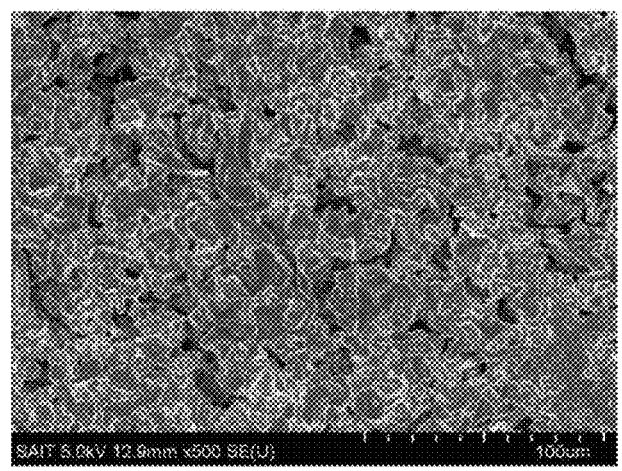
FIGS. 5B and 5C are is SEM images of a surface of the negative electrode in the lithium metal battery of Comparative Example 1.
Figure 5C:
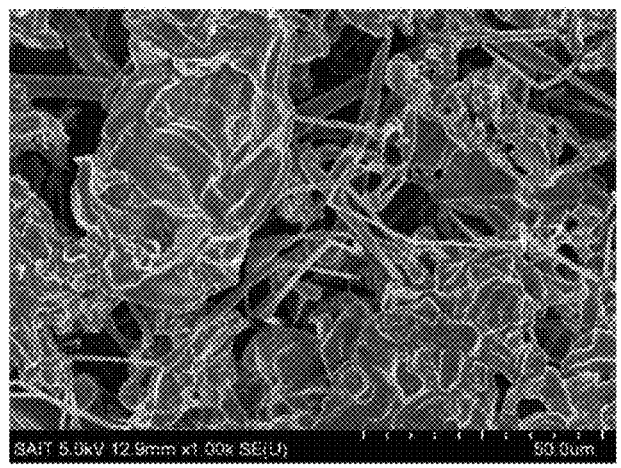
Figure 5D:
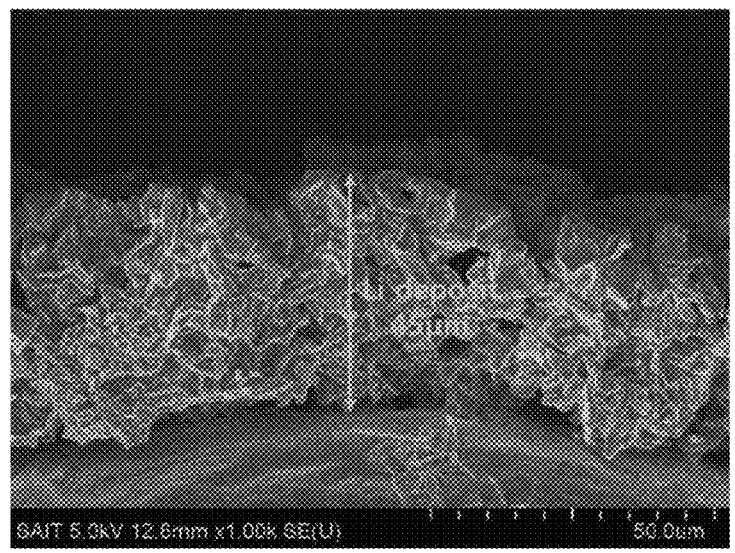
FIG. 5D are a SEM image of a cross-section of the lithium metal battery of Comparative Example 1, illustrating a lithium deposition layer formed on the lithium metal electrode of the lithium metal battery.

The SEM results are shown in FIGS. 4B to 4D and FIGS. 5B to 5D. FIGS. 4B and 4C are SEM images of a surface of the negative electrode 41 of the lithium metal battery of Example 9. FIGS. 5B and 5C are SEM images of a surface of a negative electrode of the lithium metal battery of Comparative Example 1.

Referring to FIG. 5A, the negative electrode of the lithium metal battery of Comparative Example 1 had a structure in which a lithium metal electrode 51 was stacked on a negative electrode current collector 50, and lithium dendrites 52 were randomly formed on the lithium metal electrode 51. This random growth of lithium dendrites on the lithium metal electrode 51 in the lithium metal battery of Comparative Example 1 is shown in FIGS. 5B and 5C.

However, unlike the lithium metal battery of Comparative Example 1 shown in FIGS. 5B and 5C, nearly no lithium dendrite was grown in the lithium metal battery of Example 9, as shown in FIGS. 4B and 4C. The lithium metal battery of Example 9 was also found to include a compact lithium deposition layer with a high density as shown in FIG. 4D, unlike the lithium metal battery of Comparative Example 1 shown in FIG. 5D.

2) Examples 23 to 25

Each of the lithium metal batteries of Examples 23 to 25 was charged with a constant current of 0.1 C (0.38 mA/cm²) at about 25° C. until a voltage of about 4.40 V (with respect to Li), and maintained at a constant voltage of 4.40 V (constant voltage mode) until a cutoff current of 0.05 C rate. This one-time charging was followed by measuring external pouch thickness changes in the lithium metal batteries and a thickness deviation in a lithium deposition layer of each of the lithium metal batteries with a lithium micrometer. The results are shown in Table 3. Lithium deposition density was also evaluated by measuring the thickness of the lithium deposition layer on the negative electrode of each of the lithium metal batteries. The results are shown in Table 3.

In Table 3, the particle diameter difference of the poly (styrene-b-divinylbenzene) copolymer microspheres (MS) was calculated according to the following equation.

Particle diameter difference of MS (%)={(Maximum particle diameter of MS−average particle diameter of particle)/average particle diameter of MS}×100%

TABLE 3

| Particle diameter difference of MS (%) | External pouch thickness change (μm) | Thickness deviation of lithium deposition layer (μm) | Lithium deposition density (g/cc) (g/cm3) | Thickness of lithium deposition layer (μm) |
|---|---|---|---|---|
| Example 23 (±3%) | 30-31 | ±3 | 0.260-0.270 | 28-30 |
| Example 24 (±6%) | 31-33 | ±3 | 0.245-0.260 | 29-31 |
| Example 25 (±10%) | 32-35 | ±3 | 0.225-0.255 | 30-33 |

3) Examples 26 and 27

Lithium deposition densities, external pouch changes thickness, and thicknesses and deviations of lithium deposition layers of the lithium metal batteries of Examples 26 and 27 were measured, and the results are shown in Table 4.

TABLE 4

| Example | External pouch thickness change (μm) | Thickness deviation of lithium deposition layer (μm) | Lithium deposition density (g/cc) (g/cm³) | Thickness of lithium deposition layer (μm) |
|---|---|---|---|---|
| Example 26 | 31-33 | ±4 | 0.255-0.265 | 29-31 |
| Example 27 | 29-31 | ±3 | 0.270-0.280 | 27-29 |

Evaluation Example 3: Impedance Measurement

Impedance measurements were performed on the lithium metal batteries of Example 17 and Comparative Example 1 were measured with a Solartron 1260A Impedance/Gain-Phase Analyzer in a frequency range of about 0.1 Hz to about 1 MHz and an amplitude of about ±10 mV, to measure resistance at about 25° C. by a 2-probe method.

Figure 6:
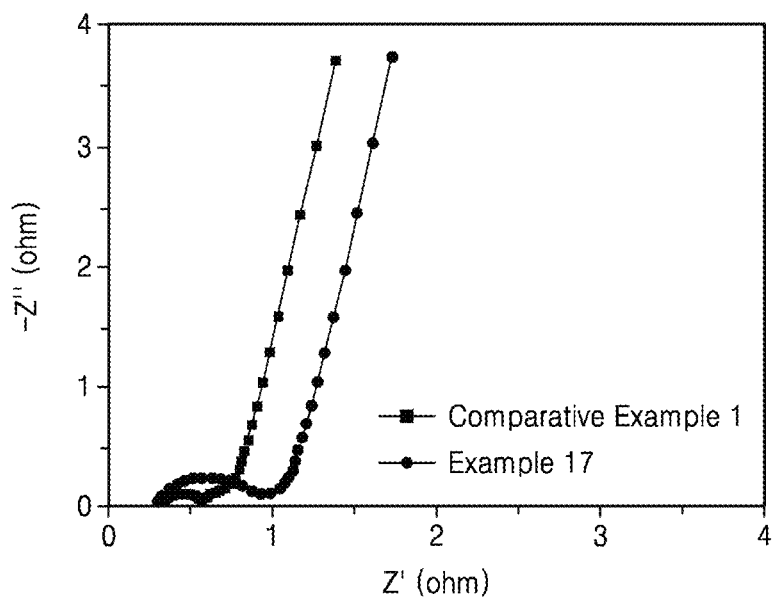
FIG. 6 is a Nyquist graph of real impedance (Z", ohm) versus imaginary impedance (Z', ohm), illustrating the results of an impedance measurement on the lithium metal batteries of Example 17 and Comparative Example 1.

Nyquist plots obtained from the impedance measurements that were performed after 24 hours from the manufacture of the lithium metal batteries of Example 17 and Comparative Example 1 are shown in FIG. 6. In FIG. 6, an interfacial resistance between the negative electrode and the electrolyte depends from the positions and sizes of semicircles.

Referring to FIG. 6, the lithium metal battery of Example 17 was found to have a lower interfacial resistance compared to the lithium metal battery of Comparative Example 1.

Evaluation Example 4: Charge-Discharge Characteristics (Discharge Capacity)

1) Example 9 and Comparative Example 1

Each of the lithium metal batteries of Example 9 and Comparative Example 1 was charged at about 25° C. with a constant current of 0.1 C rate to a voltage of about 4.40 Volts (V) (with respect to Li), and then with a constant voltage of 4.40 V until a cutoff current of 0.05 C rate, and was then discharged with a constant current of 0.1 C rate to a voltage of about 2.8 V (with respect to Li) (Formation process, $1^{st}$ cycle). This cycle of charging and discharging was performed two times more to complete the formation process.

Each of the lithium metal batteries after the formation process was charged at room temperature (25° C.) with a constant current of 0.7 C to a voltage range of about 3.0 V to 4.4 V (with respect to Li) and then discharged with a current of 0.5 C until a cutoff voltage of 3.0 V.

This cycle of charging and discharging was performed 100 times in total. The capacity retention rate of each of the lithium metal batteries was calculated using Equation 1.

Capacity retention rate (%)=($100^{th}$ cycle discharge capacity/$1^{st}$ cycle discharge capacity)×100%    Equation 1

Figure 7:
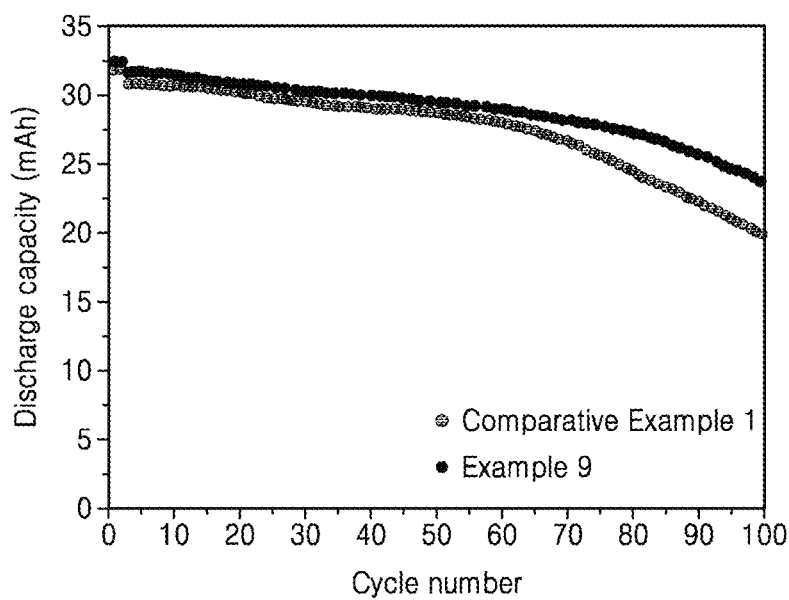
FIG. 7 is a graph of discharge capacity (milliampere hours, mAh) versus cycle number, illustrating the change in capacity retention rate in the lithium metal batteries of Example 9 and Comparative Example 1.

The results of evaluating the capacity retention rates of the lithium metal batteries are shown in FIG. 7.

Referring to FIG. 7, the lithium metal battery of Example 9 was found to have a remarkably improved capacity retention rate, compared to the lithium metal battery of Comparative Example 1.

2) Example 17 and Comparative Example 1

Discharge capacities, capacity retention rates, and coulombic efficiencies of the lithium metal batteries of Example 17 and Comparative Example 1 were measured. The results are shown in FIGS. 8A to 8C.

Figure 8A:
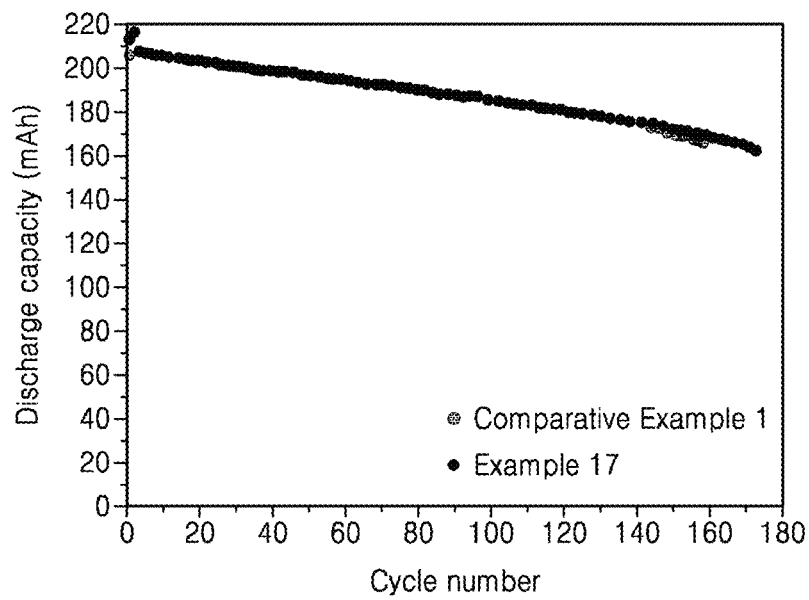
FIGS. 8A and 8B are graphs of discharge capacity (mAh) versus cycle number, showing the change in discharge capacity in the lithium metal batteries of Example 17 and Comparative Example 1.
Figure 8B:
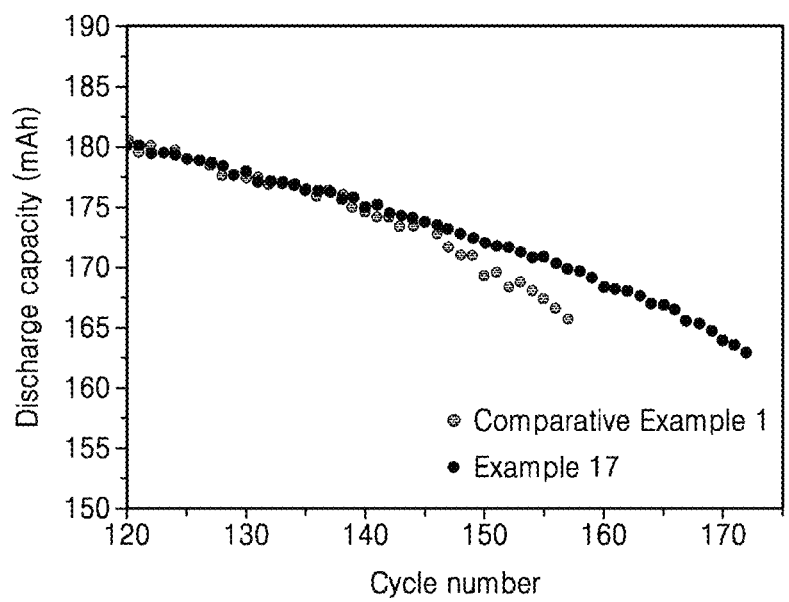
Figure 8C:
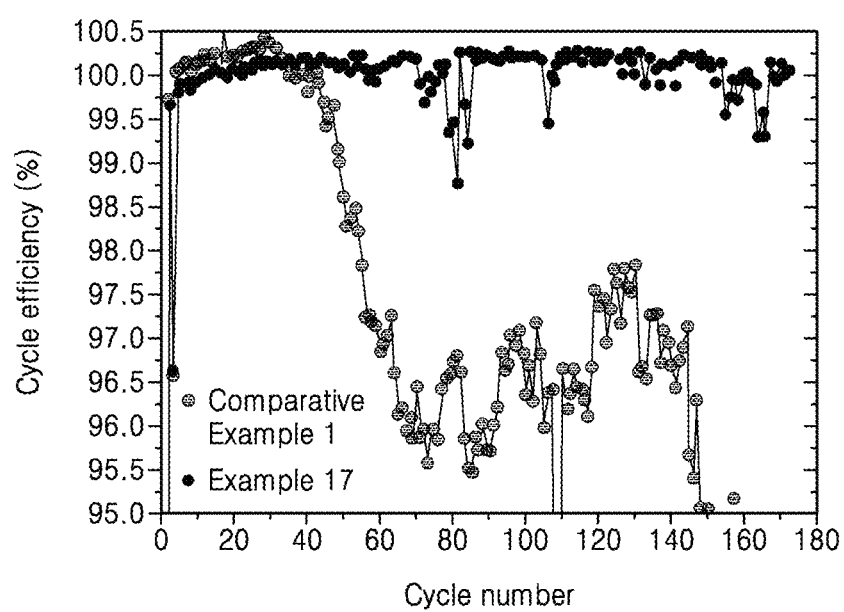
FIG. 8C is a graph of cycle efficiency (%) versus cycle number, showing the change in coulombic efficiency in the lithium metal batteries of Example 17 and Comparative Example 1.

Referring to FIGS. 8A to 8C, the lithium metal battery of Example 17 was found to have an improved discharge capacity, capacity retention rate, and coulombic efficiency, compared to the lithium metal battery of Comparative Example 1.

Evaluation Example 5: Tensile Modulus

After the protective layer-forming compositions of Examples 1 to 4 and Comparative Examples 3 and 4 were each cast on a substrate, tetrahydrofuran (THF) in the resulting cast product was slowly evaporated at about 25° C. for about 24 hours in an argon glove box, followed by drying under vacuum at about 25° C. for about 24 hours, thereby forming a protective layer in membrane form. The protective layer had a thickness of about 50 μm.

A tensile modulus of the protective layer was measured using a DMA800 (available from TA Instruments). Protective layer samples for the tensile modulus measurement were prepared according to the ASTM standard D412 (Type V specimens). The tensile modulus is also known as Young's modulus.

Variations in strain with respect to stress in the protective layer were measured at about 25° C., a relative humidity of about 30%, and a rate of 5 millimeters per minute (mm/min). The tensile modulus of the protective layer was calculated from the slope of a stress-strain curve thereof.

As a result, the protective layers of Examples 1 to 4 were found to have a higher tensile modulus of about $10^6$ Pa or greater, compared to the protective layers of Comparative Examples 3 and 4. Thus, using the protective layer of Examples 1 to 4 with such improved characteristics may effectively suppress volumetric change of the lithium metal negative electrode and growth of lithium dendrite.

Evaluation Example 6: Ion Conductivity

Ion conductivities of the protective layers formed in Examples 1 and 2 were measured as follows. The resistance in each of the protective layers was measured while scanning the temperature of the protective layer with a bias voltage of about 10 mV in a frequency range of about 1 Hz to 1 MHz, thereby measuring the ion conductivity of the protective layer.

As a result, the protective layer of Example 1 was found to have good ion conductivity. The protective layer of Example 2 was also found to have an ion conductivity equivalent to the ion conductivity of the protective layer of Example 1.

As described above, according to the one or more embodiments, a negative electrode for a lithium metal battery may include a protective layer with improved physical properties. Using this negative electrode, a lithium metal battery with an effectively suppressed volumetric change during charging and improved cycle lifetime and discharge capacity may be manufactured.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A negative electrode for a lithium metal battery, the negative electrode comprising:
   a lithium metal electrode comprising lithium metal or a lithium metal alloy; and
   a protective layer comprising a mixture of a lithium salt and a plurality of organic particles, the protective layer disposed on at least a portion of the lithium metal electrode,
   wherein the organic particle comprises a polystyrene homopolymer, a copolymer having a weight average molecular weight of about 10,000 Daltons to about 100,000 Daltons and comprising a styrene repeating unit, or a combination of the polystyrene homopolymer and the copolymer, and
   wherein the protective layer has a Young's modulus of about $10^6$ pascals to about $10^{11}$ pascals, and
   wherein the organic particle has a particle size of greater than 1 micrometer to about 100 micrometers.

2. The negative electrode of claim 1, wherein the copolymer of the plurality of particles comprises a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene-butylene-styrene) copolymer, a poly(styrene-methyl methacrylate) copolymer, a poly(styrene-acrylonitrile) copolymer, poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, a poly(acrylonitrile-styrene-(C1-C9 alkyl) acrylate) copolymer, or a combination thereof;
   wherein the styrene repeating unit of the copolymer is from about 65 to 99 parts by weight, based on 100 parts by weight of the copolymer, and in the copolymer if the styrene repeating unit is a divinylbenzene repeating unit, an amount of divinylbenzene may be from about 1 to 35 parts by weight, based on 100 parts by weight of the copolymer.

3. The negative electrode of claim 1, wherein the copolymer comprising the styrene repeating unit is a block copolymer comprising a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, or a poly(acrylonitrile-styrene-(C1-C9 alkyl) acrylate) copolymer, or a combination thereof.

4. The negative electrode of claim 1,
   wherein the protective layer comprises a single layer or multiple layers comprising the plurality of organic particles.

5. The negative electrode of claim 1, wherein the plurality of organic particles in the protective layer has have an average particle diameter of about 1.1 micrometer to about 50 micrometers.

6. The negative electrode of claim 1, wherein the plurality of organic particles in the protective layer comprises particles with different particles sizes selected from
   i. a 1:1 weight ratio of a poly(styrene-divinylbenzene) copolymer organic particle having an average particle diameter of about 3 micrometers and a poly(styrene-divinylbenzene) copolymer organic particle having an average particle diameter of about 8 micrometers;
   ii. a 1:1 weight ratio of a poly(styrene-divinylbenzene) copolymer organic particle having an average particle diameter of about 3 micrometers and a poly(styrene-divinylbenzene) copolymer organic particle having an average particle diameter of about 1.1 micrometer; or
   iii. a 1:1 weight ratio of a poly(styrene-divinylbenzene) copolymer organic particle having an average particle diameter of about 3 micrometers and a poly(styrene-divinylbenzene) copolymer organic particle having an average particle diameter of about 1.3 micrometer.

7. The negative electrode of claim 1, wherein the protective layer has a porosity of about 25% to about 50%, based on a total volume of the protective layer.

8. The negative electrode of claim 1, wherein the protective layer has a thickness of about 1 micrometer to about 10 micrometers.

9. The negative electrode of claim 1, wherein the lithium salt comprises LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, and LiB(C$_2$O$_4$)$_2$, or a combination thereof.

10. A lithium metal battery comprising a positive electrode, a negative electrode, and an electrolyte between the positive electrode and the negative electrode,
    wherein the negative electrode comprises:
    a lithium metal electrode comprising lithium metal or a lithium metal alloy; and
    a protective layer comprising a mixture of a lithium salt and a plurality of organic particles, the protective layer disposed on at least a portion of the lithium metal electrode,
    wherein the organic particle comprises a polystyrene homopolymer, a copolymer having a weight average molecular weight of about 10,000 Daltons to about 100,000 Daltons and comprising a styrene repeating unit, or a combination of the polystyrene homopolymer and the copolymer,
    wherein the protective layer has a Young's modulus of about $10^6$ Pascals to about $10^{11}$ pascals, and
    wherein the organic particles have a particle size of greater than 1 micrometer to about 100 micrometers or less.

11. The lithium metal battery of claim 10, wherein a lithium deposition layer is disposed between the protective layer and the negative electrode, and a thickness of the lithium deposition layer in the lithium metal battery is greater than 0 micrometers to about 40 micrometers.

12. The lithium metal battery of claim 10, wherein a lithium deposition layer is disposed between the protective layer and the negative electrode, and a lithium deposition density of the lithium deposition layer is from about 0.2 grams per cubic centimeter to about 0.3 grams per cubic centimeter.

13. The lithium metal battery of claim 10,
wherein a lithium deposition layer is disposed between the protective layer and the lithium metal electrode, and
wherein the lithium metal battery has a lithium deposition density which is about 50 percent to about 75 percent of a lithium deposition density of a lithium metal battery having a negative electrode without the protective layer.

14. The lithium metal battery of claim 10, wherein the electrolyte comprises a liquid electrolyte, a solid electrolyte, a gel electrolyte, a polymeric ionic liquid, or a combination thereof.

15. The lithium metal battery of claim 10, further comprising a separator.

16. The lithium metal battery of claim 10, wherein the lithium metal battery further comprises a separator, the electrolyte is a liquid electrolyte, and the lithium metal battery has a stack structure in which the negative electrode, the separator, the liquid electrolyte, and the positive electrode are sequentially stacked upon one another in this stated order.

17. A method of manufacturing a negative electrode for a lithium metal battery, the method comprising:
providing a lithium metal electrode comprising lithium metal or a lithium metal alloy; and
disposing a protective layer on at least a portion of the lithium metal electrode, wherein the protective layer comprises a mixture of a lithium salt and a plurality of organic particles,
wherein the organic particles comprise a polystyrene homopolymer, a copolymer having a weight average molecular weight of about 10,000 Daltons to about 100,000 Daltons and comprising a styrene repeating unit, or a combination of the polystyrene homopolymer and the copolymer,
wherein the protective layer has a Young's modulus of about $10^6$ pascals to about $10^{11}$ pascals, and
wherein the organic particle has a particle size of greater than 1 micrometer to about 100 micrometers.

* * * * *